US010106009B2

(12) United States Patent
Hirao et al.

(10) Patent No.: US 10,106,009 B2
(45) Date of Patent: Oct. 23, 2018

(54) SUSPENSION CONTROL APPARATUS FOR VEHICLE AND CONTROL APPARATUS FOR DAMPING-FORCE ADJUSTABLE SHOCK ABSORBER

(75) Inventors: Ryusuke Hirao, Kamagaya (JP); Takashi Nezu, Yokohama (JP); Nobuyuki Ichimaru, Yokohama (JP); Takahide Kobayashi, Kawaguchi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 679 days.

(21) Appl. No.: 12/955,153

(22) Filed: Nov. 29, 2010

(65) Prior Publication Data
US 2011/0127127 A1 Jun. 2, 2011

(30) Foreign Application Priority Data
Nov. 30, 2009 (JP) ................................. 2009-272121

(51) Int. Cl.
*B60G 17/08* (2006.01)
*B60G 17/016* (2006.01)
*B60G 17/015* (2006.01)

(52) U.S. Cl.
CPC ........... *B60G 17/08* (2013.01); *B60G 17/016* (2013.01); *B60G 2400/102* (2013.01); *B60G 2400/252* (2013.01); *B60G 2500/10* (2013.01)

(58) Field of Classification Search
CPC ...... B60G 17/06; B60G 17/08; B60G 17/015; B60G 17/016; B60G 2400/00; B60G 2600/00; B60G 2800/00; B60W 10/22; B60W 2510/22; B60W 2710/22

USPC .............................................. 188/281, 282.4
See application file for complete search history.

(56) References Cited

U.S. PATENT DOCUMENTS

| 4,691,284 | A | * | 9/1987 | Izumi et al. ..................... 701/38 |
| 4,936,425 | A | * | 6/1990 | Boone et al. ............... 188/266.1 |
| 5,425,436 | A | * | 6/1995 | Teramura et al. ............ 188/280 |
| 5,490,068 | A | * | 2/1996 | Shimizu ............... B60G 17/018 280/5.504 |
| 5,950,776 | A | * | 9/1999 | Iwasaki et al. ............ 188/266.1 |
| 8,042,818 | B2 | * | 10/2011 | Yamawaki et al. ........ 280/5.515 |

(Continued)

FOREIGN PATENT DOCUMENTS

| JP | 61-135810 | 6/1986 |
| JP | 5-169946 | 7/1993 |

(Continued)

OTHER PUBLICATIONS

Machine Translation of JP 05-169946 A.*

(Continued)

*Primary Examiner* — Thomas J Williams
(74) *Attorney, Agent, or Firm* — Wenderoth, Lind & Ponack, L.L.P.

(57) ABSTRACT

A suspension control apparatus for a vehicle including a damping-force adjustable shock absorber interposed between a vehicle body and a wheel of a vehicle, and a controller for variably controlling damping-force characteristics of the damping-force adjustable shock absorber between hard and soft. The controller is configured to switch the damping-force characteristics to a soft side when a direction of a stroke of the damping-force adjustable shock absorber is reversed between an extension stroke and a contraction stroke.

14 Claims, 14 Drawing Sheets

(56) References Cited

U.S. PATENT DOCUMENTS

| | | | |
|---|---|---|---|
| 8,398,091 B2 * | 3/2013 | Inoue et al. | 280/5.507 |
| 2005/0077692 A1 | 4/2005 | Ogawa | |
| 2005/0178628 A1 * | 8/2005 | Uchino et al. | 188/379 |
| 2007/0039790 A1 * | 2/2007 | Timoney et al. | 188/266.1 |

FOREIGN PATENT DOCUMENTS

| | | | |
|---|---|---|---|
| JP | 05169946 A | * | 7/1993 |
| JP | 06227227 A | * | 8/1994 |
| JP | 7-232529 | | 9/1995 |
| JP | 2005-104171 | | 4/2005 |
| JP | 2008-247380 | | 10/2008 |
| JP | 2009208589 A | * | 9/2009 |
| WO | WO 2009139451 A1 | * | 11/2009 |

OTHER PUBLICATIONS

JP05-169946 Electronic Translation (Corrected).*
Translation of JP 05-169946 A, translated by The McEleroy Tranalsation Company.*
Office Action dated Aug. 27, 2013 in corresponding Japanese patent application No. 2010-253583 with partial English translation.

* cited by examiner

SUSPENSION CONTROL APPARATUS FOR VEHICLE AND CONTROL APPARATUS FOR DAMPING-FORCE ADJUSTABLE SHOCK ABSORBER

BACKGROUND OF THE INVENTION

The present invention relates to a suspension control apparatus for a vehicle, which is mounted on, for example, a vehicle such as a four-wheel automobile so as to be suitably used to damp a vibration of the vehicle. Also, the present invention relates to a control apparatus for a damping-force adjustable shock absorber, which is mounted on, for example, a vehicle such as a four-wheel automobile so as to be suitably used to damp a vibration of the vehicle.

In general, on a vehicle such as an automobile, a damping-force adjustable shock absorber is provided between a vehicle body and each axle. In addition, a control apparatus for variably controlling damping-force characteristics obtained by the shock absorber according to road-surface conditions or the like is mounted on the vehicle (for example, see JP 61-135810 A and JP 2008-247380 A).

The above-mentioned type of control apparatus for the damping-force adjustable shock absorber in the related art increases a damping force based on the skyhook control theory when the vehicle runs on, for example, an "undulating road" on which the vehicle body (sprung) side is moved widely at a low frequency. In this manner, vibration damping is performed for the vehicle body side. Even under the conditions under which an unsprung vibration is generated when the vehicle runs on, for example, a road in bad conditions or a road surface having protrusions that might affect the vehicle, the damping force is similarly increased to damp the vibration on the unsprung (wheel) side.

On the other hand, if the damping-force characteristics of the shock absorber are controlled to be harder to increase the generated damping force, abnormal noise which is so-called "clattering noise" is sometimes generated.

Therefore, in the related art, for increasing or reducing the damping force of the shock absorber, control is performed so that the damping force is gradually changed or an initial increase rate of a current applied to the shock absorber is reduced, so that the generation of the abnormal noise called "clattering noise" can be suppressed.

However, the control apparatus for the damping-force adjustable shock absorber described above according to the related art has a configuration for merely suppressing a rapid change in damping force so as to suppress the generation of the abnormal noise called "clattering noise". Accordingly, the above-mentioned control apparatus for the damping-force adjustable shock absorber has a problem in that the generation of the "clattering noise" cannot always be fully suppressed.

SUMMARY OF THE INVENTION

The present invention has been made to solve the above-mentioned problem of the related art, and therefore has an object to provide a control apparatus for a damping-force adjustable shock absorber, which can suppress the generation of abnormal noise.

In order to solve the problem described above, the present invention provides a suspension control apparatus for a vehicle comprising: a damping-force adjustable shock absorber interposed between a vehicle body and a wheel of a vehicle, and a controller for variably controlling damping-force characteristics of the damping-force adjustable shock absorber between hard and soft, the controller being configured to switch the damping-force characteristics to a soft side when a direction of a stroke of the damping-force adjustable shock absorber is reversed between an extension stroke and a contraction stroke.

Also, the present invention provides a control apparatus for a damping-force adjustable shock absorber, for variably controlling damping-force characteristics of a damping-force adjustable shock absorber interposed between a vehicle body and a wheel of a vehicle between hard and soft, wherein the damping-force characteristics are switched to a soft side when a direction of a stroke of the damping-force adjustable shock absorber is reversed between an extension stroke and a contraction stroke.

DETAILED DESCRIPTION OF THE INVENTION

Hereinafter, a suspension apparatus for a vehicle comprising a control apparatus for a damping-force adjustable shock absorber according to embodiments of the present invention is described in detail referring to the accompanying drawings, taking the case where the suspension apparatus is used for a four-wheel automobile as an example.

Figure 1:
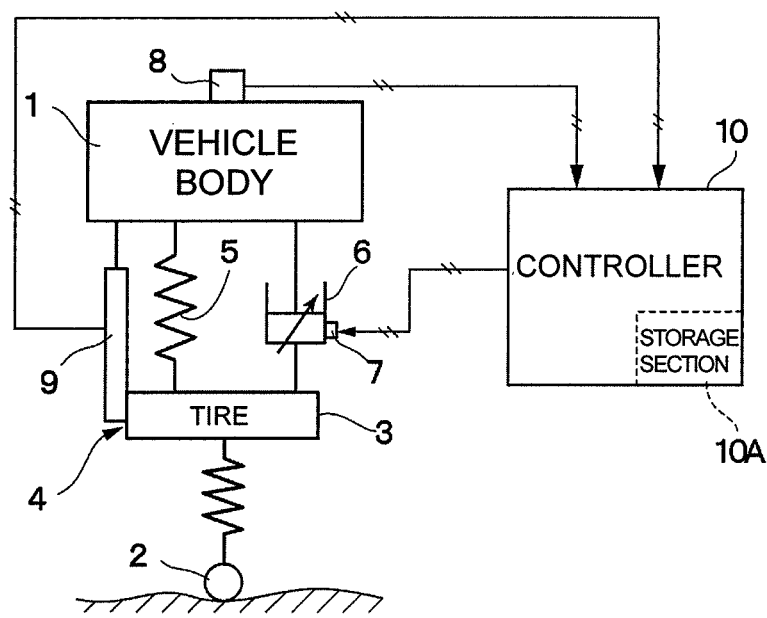
FIG. 1 is a configuration diagram illustrating a suspension control apparatus for a vehicle comprising a control apparatus for a damping-force adjustable shock absorber according to a first embodiment of the present invention.

FIGS. 1 to 8 illustrate a first embodiment of the present invention. In FIG. 1, a vehicle body 1 corresponding to a body of a vehicle is illustrated. Below the vehicle body 1, for example, right and left front wheels and right and left rear wheels (hereinafter, collectively referred to as wheels 2) are provided. Each of the wheels 2 includes a tire 3 and the like.

A suspension apparatus 4 is interposed between the vehicle body 1 and the wheel 2. The suspension apparatus 4 includes a suspension spring 5 (hereinafter, referred to simply as "spring" 5) and a damping-force adjustable shock absorber 6 (hereinafter, referred to simply as "shock absorber" 6) provided between the vehicle body 1 and the wheel 2 in parallel to the spring 5. Note that, in FIG. 1, the case where the single suspension apparatus 4 is provided between the vehicle body 1 and the wheel 2 is illustrated as an example. However, the number of the suspension apparatuses 4 is, for example, four in total so that each of the suspension apparatuses 4 is independently provided between each of the four wheels 2 and the vehicle body 1. Only one of the plurality of the suspension apparatuses 4 is schematically illustrated in FIG. 1.

The shock absorber 6 of the suspension apparatus 4 is constituted by using a damping-force adjustable hydraulic shock absorber. The shock absorber 6 is provided with an actuator 7 including a damping-force adjustment valve so as to continuously adjust characteristics of a generated damping force (damping-force characteristics) from hard to soft. Here, the "hard characteristics" mean that a damping force with the hard characteristics, which is generated by the shock absorber performing extension/contraction movement at a given relative velocity, is larger than a damping force with the "soft characteristics" generated when the shock absorber performs extension/contraction movement at the same given relative velocity. Note that, the damping-force adjustment valve is not necessarily required to change the damping-force characteristics continuously. The damping-force adjustment valve may adjust the damping force in two, three, or more stages.

An acceleration sensor 8 is provided to the vehicle body 1. The acceleration sensor 8 is mounted on the vehicle body 1 at a position, for example, in the vicinity of the shock absorber 6 so as to detect a vertical vibration acceleration on the vehicle body 1 side corresponding to a so-called sprung side. The acceleration sensor 8 constitutes a vehicle-state detector for detecting a vehicle state while the vehicle is running as a vertical vibration acceleration and outputs a detected signal to a controller 10 described below.

A vehicle-height sensor 9 detects a height of the vehicle body 1. The vehicle-height sensor 9 detects a position (height position) of the vehicle 1 relative to the wheel 2 and outputs a detected signal to the controller 10 described below. During an extension stroke in which a rod of the shock absorber 6 extends, the height (vehicle height) of the vehicle body 1 gradually increases. During a contraction stroke in which the rod of the shock absorber 6 is contracted, the vehicle height gradually reduces.

Figure 3:
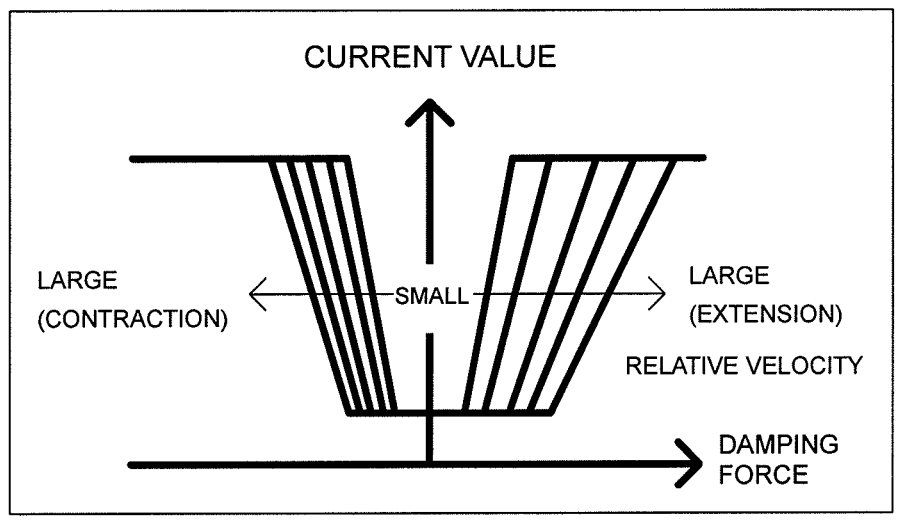
FIG. 3 is a characteristic line diagram illustrating a current-value map illustrated in FIG. 2 in the relation between a damping force and a relative velocity.
Figure 4:
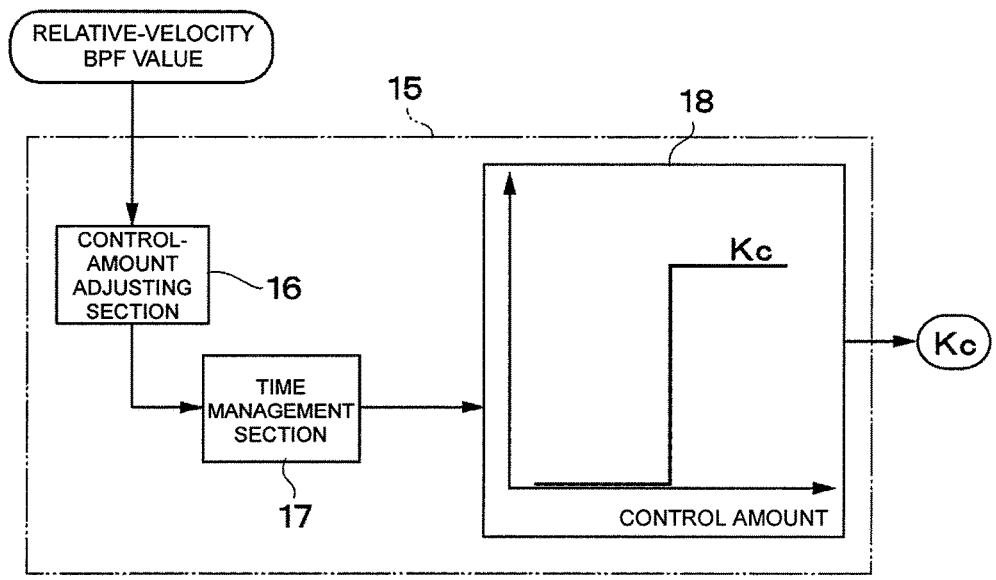
FIG. 4 is a control block diagram illustrating a clattering-noise generation determination section illustrated in FIG. 2 in a specific manner.

The controller 10 (control apparatus for a damping-force adjustable shock absorber) is constituted by a microcomputer. An input side of the controller 10 is connected to the acceleration sensor 8 and the vehicle-height sensor 9, whereas an output side thereof is connected to the actuator 7 of the shock absorber 6. The controller 10 includes a storage section 10A constituted by a ROM, a RAM, or the like. In the storage section 10A, there are updatably stored a control processing program for a skyhook control section 11 illustrated in FIG. 2, a conversion map for a signal converting section 21 illustrated in FIG. 2, a current-value map showing the relation among a damping force, a relative velocity, and a current value, which is illustrated in FIG. 3, a gain map 18 of a gain Kc for a control amount, which is illustrated in FIG. 4, a criterion value a illustrated in FIG. 6, and a first threshold value b and a second threshold value −b illustrated in FIGS. 7 and 8.

Figure 2:
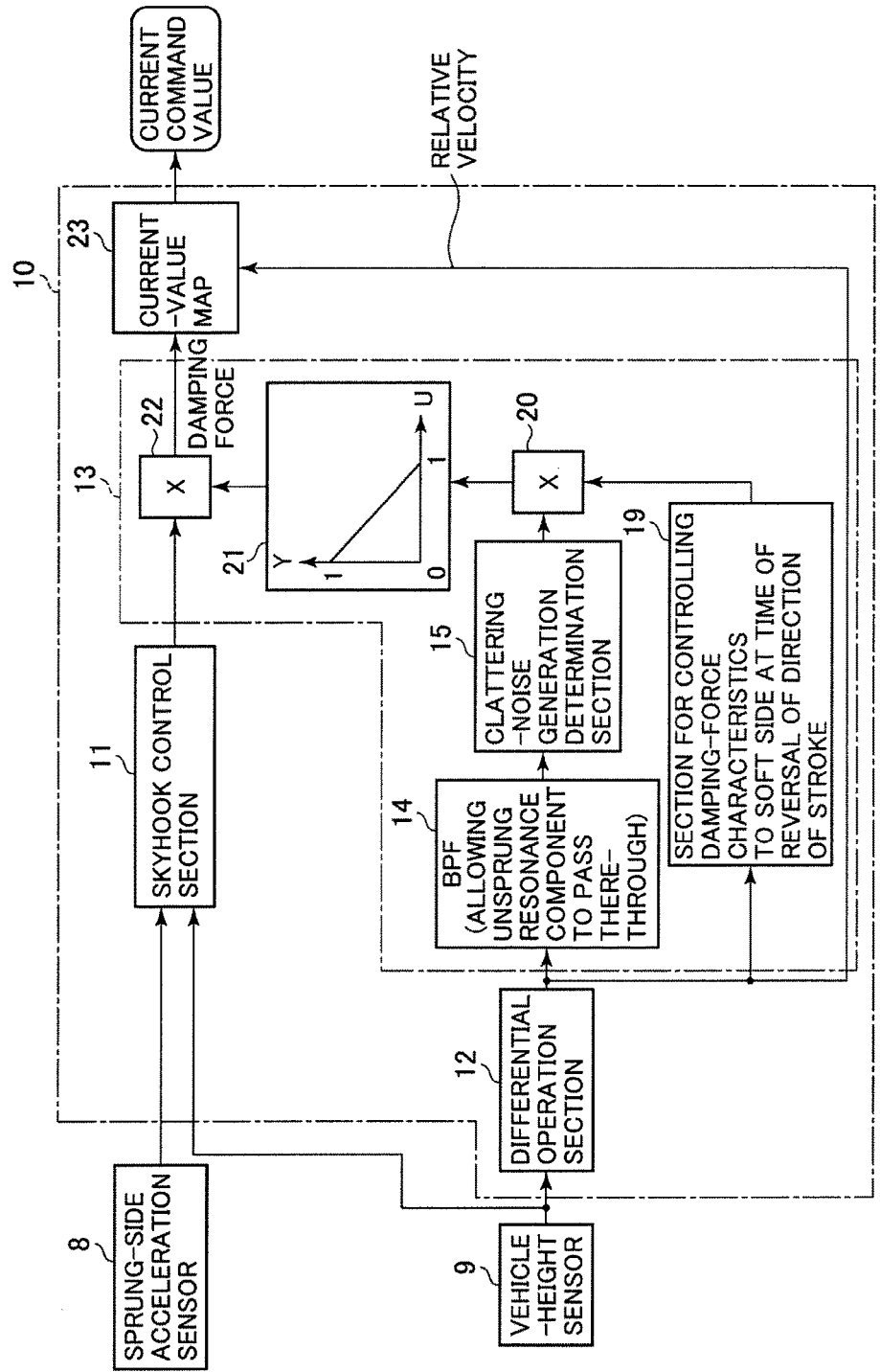
FIG. 2 is a control block diagram illustrating the contents of control performed by a controller illustrated in FIG. 1.

Here, as illustrated in FIG. 2, the controller 10 includes the skyhook control section 11, a differential operation section 12, a clattering-noise control section 13, a current-value map 23, and the like. The skyhook control section 11 corresponds to target damping-force setting means for obtaining a skyhook control amount (see a characteristic line 28 illustrated in FIGS. 6 and 8) as a target damping force according to the skyhook theory in response to a signal output from the acceleration sensor 8 on the sprung side and a signal output from the vehicle-height sensor 9. The differential operation section 12 differentiates the signal output from the vehicle-height sensor 9 to calculate a vertical relative velocity (see a characteristic line 29 illustrated in FIGS. 7 and 8) between the vehicle body 1 and the wheel 2. The clattering noise control section 13 and the current-value map 23 are described below.

The controller 10 outputs a current command value obtained according to the current-value map 23 (see FIG. 3) to the actuator 7 of the shock absorber 6 as described below. As a result, the damping-force characteristics of the shock absorber 6 are variably controlled to damp and reduce the vibration of the vehicle and suppress the generation of abnormal noise which is so-called "clattering noise".

Next, the clattering-noise control section 13 included in the controller 10 includes a filter section 14 (hereinafter, referred to as "BPF" 14), a clattering-noise generation determination section 15, a section 19 for controlling damping-force characteristics to soft side at time of reversal of direction of stroke, a signal processing section 20, a signal converting section 21, and another signal processing section 22 different from the signal processing section 20. The filter section 14 corresponds to vibration-component extracting means for performing bandpass filter processing on a signal of the relative velocity, which is obtained by the differential operation section 12, so as to extract a vibration component at a predetermined specific frequency (specifically, an unsprung natural frequency, for example, in the vicinity of 13 Hz corresponding to a resonance frequency on the wheel 2 side). The clattering-noise generation determination section 15 determines based on a signal of the vibration component extracted by the BPF 14 whether or not the abnormal noise called "clattering noise" is generated by the shock absorber 6. The section 19 for controlling damping-force characteristics to soft side at time of reversal of direction of stroke, the signal processing section 20, the signal converting section 21, and the other signal processing section 22 are described below.

Then, the clattering-noise control section 13 determines based on the relative velocity calculated by differentiating the signal output from the vehicle-height sensor 9 in the differential operation section 12 whether or not the clattering noise is generated. According to the result of determination, the clattering-noise control section 13 performs the skyhook control and control for switching the damping-force characteristics to the soft side when a direction of a stroke is reversed, which is performed for preventing the generation of the clattering noise, to variably control the generated damping force so as to prevent the clattering noise from being generated as described below.

In this case, as illustrated in FIG. 4, the clattering-noise generation determination section 15 includes a control-amount adjusting section 16, a time management section 17, and the gain map 18. The control amount adjustment section 16 calculates a control amount corresponding to an absolute value of an unsprung resonance component of the relative velocity from an unsprung resonance component of the relative velocity (indicated by a characteristic line 24 illustrated in FIG. 6) calculated by the BPF 14, as indicated by a characteristic line 25 illustrated in FIG. 6. Then, the time management section 17 manages time so that the generated damping force can be reduced to be softer at the time of reversal of the direction of the stroke of the shock absorber 6 according to the control amount obtained by the control-amount adjusting section 16.

Specifically, when the time management section 17 detects a peak value (maximum value) of the control amount (indicated by the characteristic line 25 illustrated in FIG. 6) obtained by the control-amount adjusting section 16, the time management section 17 holds the detected peak value for a predetermined period of time. As the peak value becomes larger (specifically, as a peak value of the absolute value of the unsprung resonance component of the relative velocity becomes larger), the time management section 17 holds the detected peak value for a longer period of time. Specifically, the controller 10 switches the damping-force characteristics so that when the direction of the stroke of the shock absorber 6 is reversed, the damping-force characteristics become softer as the vibration component at the specific frequency (specifically, the unsprung natural frequency in the vicinity of, for example, 13 Hz) becomes larger. As a result, the time management section 17 outputs a value of the control amount after the passage through the time management section, which is indicated by a characteristic line 26 illustrated in FIG. 6, after holding the value for a short period of time (for example, 0.1 second) when the value of the control amount (indicated by the characteristic line 25 illustrated in FIG. 6) is small and for a long period of time (for example, one second) when the value of the control amount is large.

Figure 6:
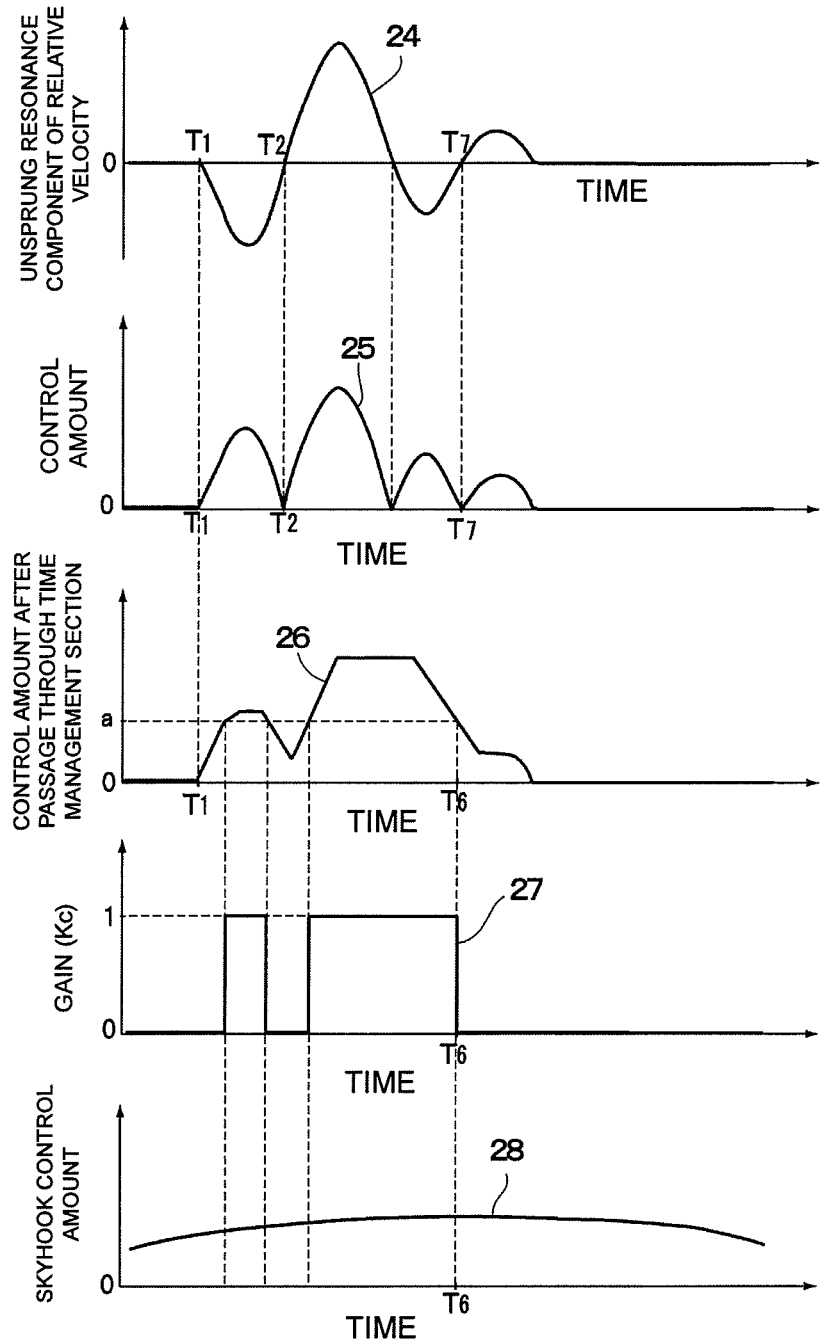
FIG. 6 is a characteristic line diagram illustrating the relation among an unsprung resonance component of the relative velocity, a control amount, a control amount after the passage through a time management section, a gain, and a skyhook control amount.

Then, when the control amount (indicated by the characteristic line 26 illustrated in FIG. 6) output from the time management section 17 is input to the gain map 18, the gain map 18 outputs the gain Kc according to the control amount at this time as indicated by a characteristic line 27 illustrated in FIG. 6. In this embodiment, the gain Kc is set to zero "0" when the control amount is less than a predetermined criterion value a (or equal to or smaller than the criterion value a) and is set to "1" when the control amount is equal to or larger than the criterion value a (or is larger than the criterion value a).

As described above, the clattering-noise generation determination section 15 outputs the value "1" for a predetermined time according to the amplitude of the vibration component at the specific frequency which is extracted by the BPF 14, when the amplitude of the vibration component is large.

Figure 7:
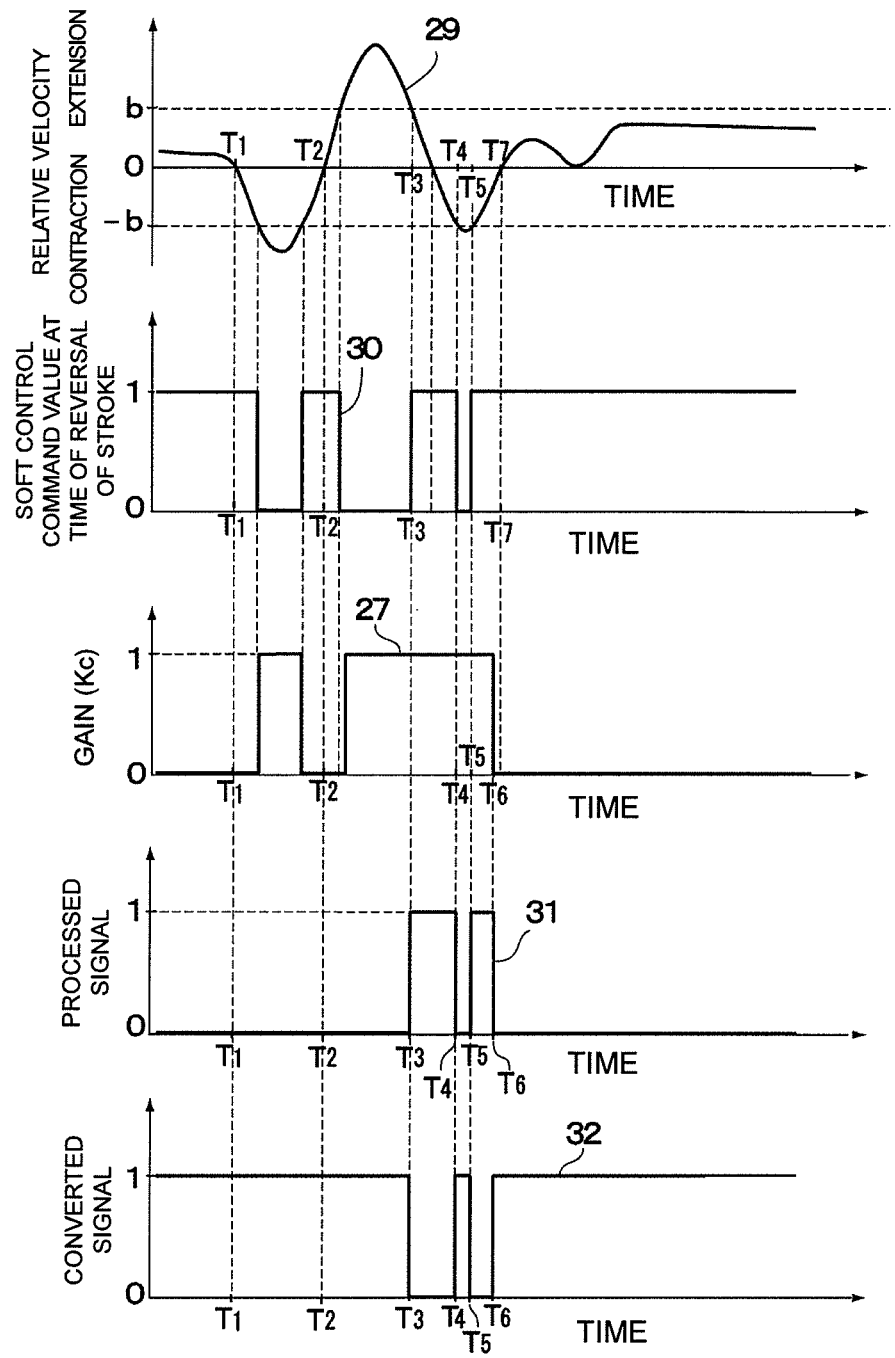
FIG. 7 is a characteristic line diagram illustrating the relation among the relative velocity, a command value for controlling damping-force characteristics to soft side at time of reversal of direction of stroke, the gain, a processed signal, and a converted signal.

Here, the relative velocity between the vehicle body 1 and the wheel 2 has a positive value during the extension stroke of the shock absorber 6 and has a negative value during the contraction stroke of the shock absorber 6. Specifically, the time, at which the value of the relative velocity (see the characteristic line 29 illustrated in FIG. 7) between the vehicle body 1 and the wheel 2, the relative velocity being obtained by differentiating the signal output from the vehicle-height sensor 9 in the differential operation section 12 as illustrated in FIGS. 2 and 7, changes from positive to negative through zero "0", corresponds to the time of the reversal of the direction of the stroke, at which the extension stroke of the shock absorber 6 is switched to the contraction stroke. On the other hand, the time, at which the value of the relative velocity between the vehicle body 1 and the wheel 2 changes from negative to positive, corresponds to the time of the reversal of the direction of the stroke, at which the contraction stroke is switched to the extension stroke.

Figure 5:
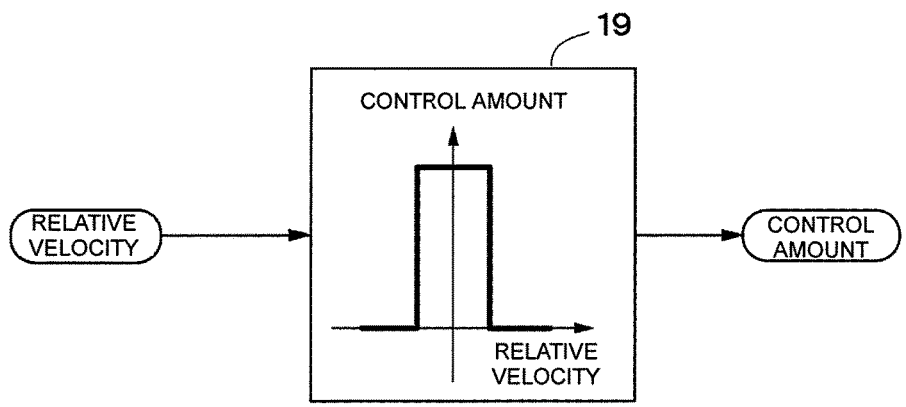
FIG. 5 is a control block diagram illustrating a section for controlling damping-force characteristics to soft side at time of reversal of direction of stroke, illustrated in FIG. 2 in a specific manner.

The section 19 for controlling damping-force characteristics to soft side at time of reversal of direction of stroke illustrated in FIGS. 2 and 5 outputs a control signal as a soft control command value (soft command) for reducing and making softer the generated damping force when the direction of the stroke of the shock absorber 6 is reversed between the extension stroke and the contraction stroke, specifically, when the relative velocity between the vehicle body 1 and the wheel 2 becomes around zero.

More specifically, when the relative velocity is between the first threshold value b and the second threshold value −b, that is, falls within the range of ±b (for example, b=0.1 m/s) (−b≤relative velocity≤b) as indicated by the characteristic line 29 illustrated in FIG. 7, the section 19 for controlling damping-force characteristics to soft side at time of reversal of direction of stroke determines that the direction of the stroke is reversed currently and outputs the control amount corresponding to the soft command (in this embodiment, the value "1" as a command value indicated by a characteristic line 30 illustrated in FIG. 7). On the other hand, when the relative velocity is larger than the first threshold value b or smaller than the second threshold value −b (out of the range of ±b; relative velocity<−b or b<relative velocity), the section 19 for controlling damping-force characteristics to soft side at time of reversal of direction of stroke determines that the direction of the stroke is not reversed currently and therefore, outputs the control amount corresponding to a hard command (the value "0" as the command value indicated by the characteristic line 30 illustrated in FIG. 7).

The signal processing section 20 illustrated in FIG. 2 multiplies the signal of the gain Kc (indicated by the characteristic line 27 illustrated in FIG. 7), which is output from the clattering-noise generation determination section 15, and the command value output from the section 19 for controlling damping-force characteristics to soft side at time of reversal of direction of stroke (indicated by the characteristic line 30 illustrated in FIG. 7) to output a processed signal indicated by a characteristic line 31 illustrated in FIG. 7. Then, the signal converting section 21 performs conversion processing for inverting the processed signal output from the signal processing section 20 as indicated by a characteristic line illustrated in FIG. 2 and outputs the inverted signal as a converted signal indicated by a characteristic line 32 illustrated in FIG. 7.

The signal processing section 22 multiplies the converted signal output from the signal converting section 21 (indicated by the characteristic line 32 illustrated in FIGS. 7 and 8) and the control amount (indicated by the characteristic line 28 illustrated in FIGS. 6 and 8) obtained by the skyhook control section 11 so as to output the control amount after the correction for clattering-noise control as a signal corresponding to the target damping force (control amount) to the current-value map 23 in a later stage.

Here, in the current-value map 23, the relation between the target damping force and the current value is variably set according to the relative velocity, as illustrated in FIG. 3 and is created based on experimental data obtained by the inventors of the present invention. The current-value map 23 performs computation processing to calculate the current command value to be output to the actuator 7 of the shock absorber 6 as shown, for example, a current value indicated by the characteristic line 34 illustrated in FIG. 8, based on the damping force (control amount indicated by the characteristic line 33 illustrated in FIG. 8) output from the signal processing section 22 and the relative velocity (indicated by the characteristic line 29 illustrated in FIGS. 7 and 8) output from the differential operation section 12. The shock absorber 6 variably controls the damping force to be generated in a continuous manner or in a plurality of stages between hard and soft according to the current command value fed to the actuator 7.

The suspension control apparatus for a vehicle comprising the control apparatus for the damping-force adjustable shock absorber according to the first embodiment has the configuration as described above. Next, processing for variably controlling the damping-force characteristics of the shock absorber 6 by the controller 10 (control apparatus for the damping-force adjustable shock absorber) is described.

First, when the vehicle runs, the vertical vibration acceleration signal on the sprung (vehicle body 1) side is input from the acceleration sensor 8 to the controller 10, as illustrated in FIGS. 1 and 2. In addition, the vehicle-height signal on the vehicle body 1 side relative to the wheel 2 is input from the vehicle-height sensor 9 to the controller 10.

Then, the skyhook control section 11 included in the controller 10 obtains the skyhook control amount corresponding to the target damping force determined according to the skyhook theory as indicated by the characteristic line 28 illustrated in FIG. 6 based on the vibration acceleration signal output from the acceleration sensor 8 on the sprung side and the vehicle-height signal output from the vehicle-height sensor 9. The vehicle-height signal output from the vehicle-height sensor 9 is differentiated by the differential operation section 12 to be calculated as the vertical relative velocity between the vehicle body 1 and the wheel 2 (for example, see the characteristic line 29 illustrated in FIG. 7).

Next, the BPF 14 of the clattering-noise control section 13 included in the controller 10 performs the bandpass filter processing on the signal of the relative velocity obtained by the differential operation section 12 to extract the unsprung natural frequency in the vicinity of, for example, 13 Hz (specifically, the resonance frequency on the wheel 2 side) as the unsprung resonance component of the relative velocity as indicated by the characteristic line 24 illustrated in FIG. 6.

Then, in the clattering-noise generation determination section 15, as illustrated in FIG. 4, the control-amount adjusting section 16 calculates the control amount corresponding to the absolute value of the unsprung resonance component of the relative velocity from the BPF value of the relative velocity, that is, the unsprung resonance component of the relative velocity (indicated by the characteristic line 24 illustrated in FIG. 6), as indicated by the characteristic line 25 illustrated in FIG. 6.

Next, the control amount after the passage through the time management section, which is output from the time management section 17, becomes the signal which is held for a shorter period of time (for example, about 0.1 second) when the peak value (maximum value) of the control amount (indicated by the characteristic line 25 illustrated in FIG. 6) obtained in the control-amount adjusting section 16 is small and becomes the signal which is held for a longer period of time (for example, about 1 second) when the peak value of the control amount obtained by the control-amount adjusting section 16 is large.

Next, when the control amount (indicated by the characteristic line 26 illustrated in FIG. 6) is input from the time management section 17 to the gain map 18, the gain map 18 outputs the gain Kc according to the input control amount as indicated by the characteristic line 27 illustrated in FIG. 6. Specifically, the gain Kc in this case is set to zero "0" when, for example, the control amount is equal to or less than the criterion value a, and is set to "1" when the control amount exceeds the criterion value a.

On the other hand, the section 19 for controlling damping-force characteristics to soft side at time of reversal of direction of stroke included in the controller 10 determines that the direction of the stroke of the shock absorber 6 is currently reversed between the extension stroke and the contraction stroke when the relative velocity between the vehicle body 1 and the wheel 2 is between the first threshold value b and the second threshold value −b (for example, b=0.1 m/s) (−b≤relative velocity≤b) as indicated by the characteristic line 29 illustrated in FIG. 7. Then, the section 19 for controlling damping-force characteristics to soft side at time of reversal of direction of stroke outputs the control amount corresponding to the soft command, that is, the value "1" corresponding to the command value indicated by the characteristic line 30 illustrated in FIG. 7.

On the other hand, when the relative velocity is larger than the first threshold value b or smaller than the second threshold value −b (out of the range of ±b; relative velocity<−b or b<relative velocity), the section 19 for controlling damping-force characteristics to soft side at time of reversal of direction of stroke determines that the direction of the stroke of the shock absorber 6 is not currently reversed. Then, the section 19 for controlling damping-force characteristics to soft side at time of reversal of direction of stroke outputs the control amount corresponding to the hard command, that is, the value "0" corresponding to the command value indicated by the characteristic line 30 illustrated in FIG. 7. As describe above, when the relative velocity between the vehicle body 1 and the wheel 2 becomes around zero (within the range of ±b), the section 19 for controlling damping-force characteristics to soft side at time of reversal of direction of stroke outputs the value "1" as the soft control command value so as to reduce the generated damping force and make the damping-force characteristics softer. When the relative velocity is away from the vicinity of zero (out of the range of ±b), the section 19 for controlling damping-force characteristics to soft side at time of reversal of direction of stroke outputs the value "0" as the soft control command value.

Next, the signal processing section 20 illustrated in FIG. 2 multiplies the signal of the gain Kc (indicated by the characteristic line 27 illustrated in FIG. 7) output from the clattering-noise generation determination section 15 and the command value (indicated by the characteristic line 30 illustrated in FIG. 7) output from the section 19 for controlling damping-force characteristics to soft side at time of reversal of direction of stroke, so as to output the processed signal indicated by the characteristic line 31 illustrated in FIG. 7. As a result, the processed signal output from the signal processing section 20 has a value "0" as a result of the multiplication of the signal of the gain Kc and the command value, for example, at time T1 and time T2 illustrated in FIG. 7.

However, the processed signal (indicated by the characteristic 31 illustrated in FIG. 7) output from the signal processing section 20 has the value "1", for example, between time T3 and time T4 as a result of the multiplication of the signal of the gain Kc and the command value. The processed signal has the value "0" between the time T4 and time T5, has the value "1" between the time T5 and time T6, and holds the value "0" after the time T6. Specifically, the signal processing section 20 outputs the soft control command value "1" (processed signal (indicated by the characteristic line 31 illustrated in FIG. 7)) for switching the damping-force characteristics to the soft side when it is determined that the clattering noise is generated and, in addition, the direction of the stroke is reversed.

Then, the signal converting section 21 illustrated in FIG. 2 performs the signal conversion so that the processed signal output from the signal processing section 20 is inverted and outputs the inverted signal as the converted signal indicated by the characteristic line 32 illustrated in FIG. 7. As a result, the converted signal output from the signal converting section 21 is held to the value "1" over the time T1, T2 and T3, has the value "0" between the time T3 and time T4, has the value "1" between the time T4 and time T5, and has the value "0" again between the time T5 and time T6, and is held to the value "1" after the time T6. Specifically, the signal processing section 21 outputs the processed signal "0" (converted signal (indicated by the characteristic line 32 illustrated in FIG. 7)) for controlling the damping-force characteristics to be switched to the soft side when it is determined that the clattering noise is generated and, in addition, the direction of the stroke is reversed.

Subsequently, the signal processing section 22 multiplies the converted signal (indicated by the characteristic line 32 illustrated in FIGS. 7 and 8) output from the signal converting section 21 and the control amount (indicated by the characteristic line 28 illustrated in FIGS. 6 and 8) obtained by the skyhook control section 11 to calculate the control amount after the correction for clattering-noise control, which is indicated by the characteristic line 33 illustrated in FIG. 8, as the signal (control amount) corresponding to the target damping force.

Figure 8:
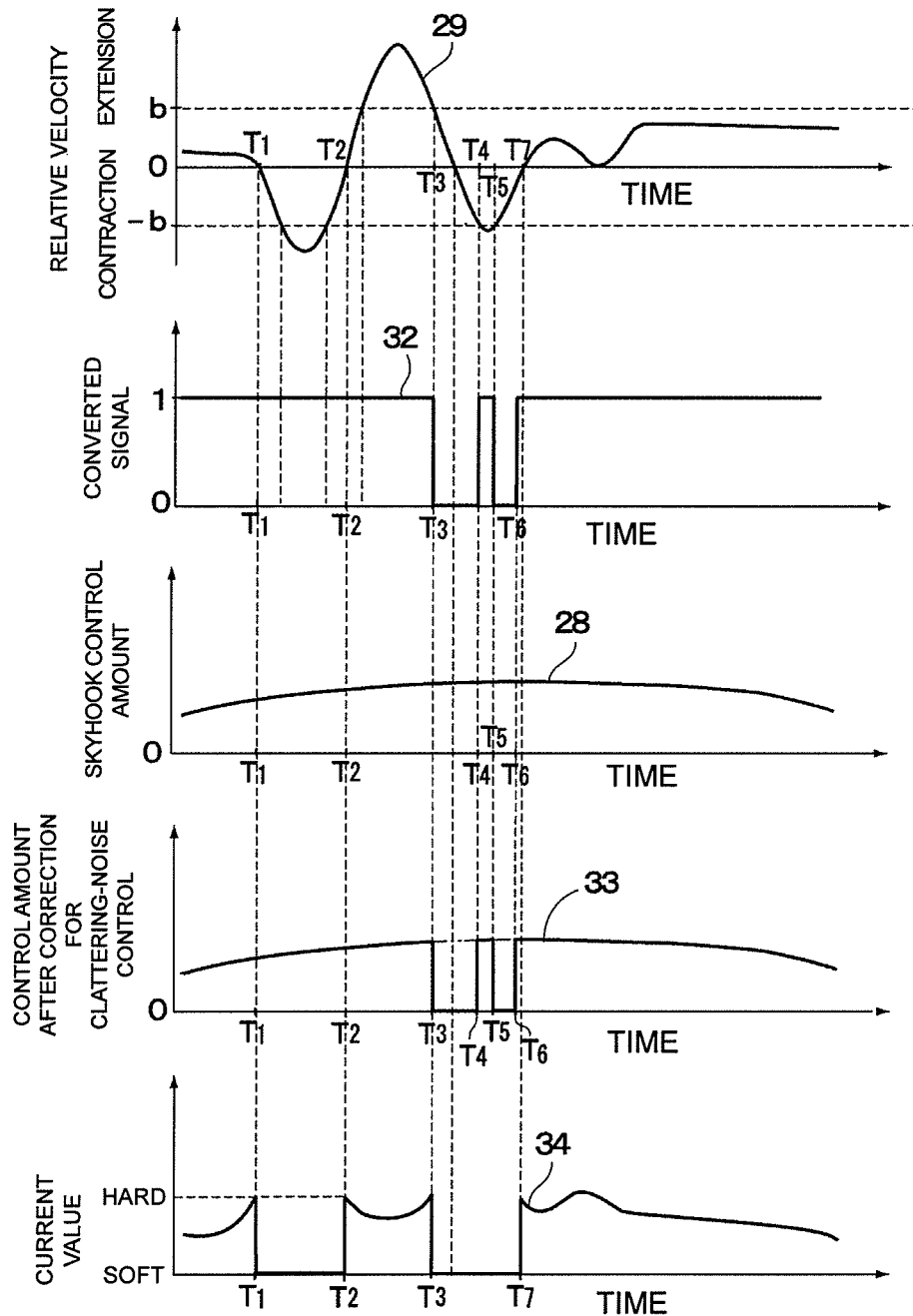
FIG. 8 is a characteristic line diagram illustrating the relation among the relative velocity, the converted signal, the skyhook control amount, the control amount after the correction for clattering-noise control, and the current value.

As a result, the control amount output from the signal processing section 22 is held to the value of the control amount, which is obtained by the skyhook control section 11, for example, over the time T1, T2 and T3 illustrated in FIG. 8, and has the value "0" between the time T3 and the time T4. The control amount has the value of the control amount obtained by the skyhook control section 11 between the time T4 and the time T5, has the value "0" between the time T5 and the time T6, and is held to the value of the control amount obtained by the skyhook control section 11 after the time T6. Specifically, the signal processing section 22 outputs the value "0" of the control amount (indicated by the characteristic line 33 illustrated in FIG. 8) for controlling the damping-force characteristics to the soft side when it is determined that the clattering noise is generated and, in addition, the direction of the stroke is reversed.

Next, the current-value map 23 included in the controller 10 performs computation processing to calculate the current command value to be output to the actuator 7 of the shock absorber 6 as a current value, for example, indicated by the characteristic line 34 illustrated in FIG. 8, based on the damping force (control amount indicated by the characteristic line 33 illustrated in FIG. 8) output from the signal processing section 22 and the relative velocity output from the differential operation section 12 (indicated by the characteristic line 29 illustrated in FIG. 7).

As a result, the shock absorber 6 variably controls the damping force to be generated between hard and soft (medium may be added) in a continuous manner or in a plurality of stages according to the current command value output from the current-value map 23 to be fed to the actuator 7. In this case, the control amount after the correction for clattering-noise control requests the plus (extension) as indicated by the characteristic line 33 illustrated in FIG. 8. Therefore, as the current value indicated by the characteristic line 34, the current value corresponding to soft characteristics is output when the relative velocity is negative (which indicates the contraction stroke). On the other hand, when the relative velocity is positive (which indicates the extension stroke), the value according to both of the amplitude of the target damping force and the amplitude of the relative velocity is output. Then, since the damping force tends to be large when the relative velocity is large, the current command value is controlled to be reduced. On the other hand, since the damping force tends to be small when the relative velocity is small, the current command value is controlled to be increased.

By the way, as properties of the "clattering noise" generated by the shock absorber 6 while the vehicle is running, the inventors of the present invention have found the following points (1) to (4).

(1) The "clattering noise" is unlikely to be generated when the damping force generated by the shock absorber 6 is small.

(2) The "clattering noise" is likely to be generated when the amount of tension of an upper mount is large during the extension stroke of the shock absorber 6.

(3) The "clattering noise" is generated at the time of the reversal of the direction of the stroke from the contraction stroke to the extension stroke or from the extension stroke to the contraction stroke.

(4) The "clattering noise" is likely to be generated when the frequency of the stroke of the shock absorber 6 is at an oscillation frequency (for example, 13 Hz) in the vicinity of the unsprung natural frequency.

Based on the above-mentioned points, the generation of the "clattering noise" is supposed. When the risk of generation of the "clattering noise" is high, the damping force is set smaller and softer at the time of reversal of the direction of the stroke. As a result, the generation of the clattering noise can be prevented.

As described above, according to the first embodiment, when the direction of the stroke of the shock absorber 6 is reversed between the extension stroke and the contraction stroke, the damping-force characteristics are switched to the soft side. Therefore, the generation of the "clattering noise", which is likely to be generated when the damping force generated by the shock absorber 6 is large and, in addition, when the direction of the stroke is reversed, is suppressed and reduced by switching the damping-force characteristics to the soft side. As a result, vehicle ride comfort can be improved.

Moreover, the clattering-noise control section 13 illustrated in FIG. 2 can determine the generation of the clattering noise based on the relative velocity (unsprung resonance component corresponding to the relative velocity BPF value illustrated in FIG. 4) calculated by differentiating the signal output from the vehicle-height sensor 9. According to the result of determination, the clattering-noise control section 13 controls the skyhook control section 11 and the section 19 for controlling damping-force characteristics to soft side at time of reversal of direction of stroke, which prevents the generation of the clattering noise, to prevent the generation of the clattering noise.

In this case, as indicated by the characteristic lines 24 and 27 illustrated in FIG. 6, when the unsprung resonance component of the relative velocity is small, the gain Kc obtained according to the gain map 18 illustrated in FIG. 4 becomes zero. Therefore, the damping-force control can be performed as conventionally. When the unsprung resonance component of the relative velocity is large, the value of the gain Kc becomes as large as "1". Thus, the control for switching the damping-force characteristic to soft side at the time of reversal of the direction of stroke is performed, and the control amount after the correction for the clattering-noise control (indicated by the characteristic line 33), which is obtained by correcting the skyhook control amount, is set to zero. Then, based on the control amount and the relative velocity which are finally output, the current command value is calculated.

In the time management section 17 of the clattering-noise generation determination section 15, as the peak value (maximum value) of the control amount obtained by the control-amount adjusting section 16 becomes larger (specifically, as the peak value of the absolute value of the unsprung resonance component of the relative velocity becomes larger), the value is kept for a longer period of time. Thus, the clattering noise can be appropriately controlled at the time of the reversal of the stroke, which occurs when the relative velocity is in the vicinity of zero.

As described above, when it is determined that the clattering noise is generated, the damping force characteristics are controlled to be switched to the soft side at the time of the reversal of the direction of the stroke. Accordingly, the generation of the clattering noise by the shock absorber 6 can be prevented. Moreover, the unsprung resonance component of the relative velocity, which is used for determining the generation of the clattering noise, is extremely small when the vehicle runs on an undulating road or makes a lane change while running. Therefore, the damping-force characteristics are not controlled to be switched to the soft side in this case. As a result, the effects of controlling the damping force, which are conventionally obtained under the above-mentioned conditions, can be prevented from being sacrificed.

Figure 9:
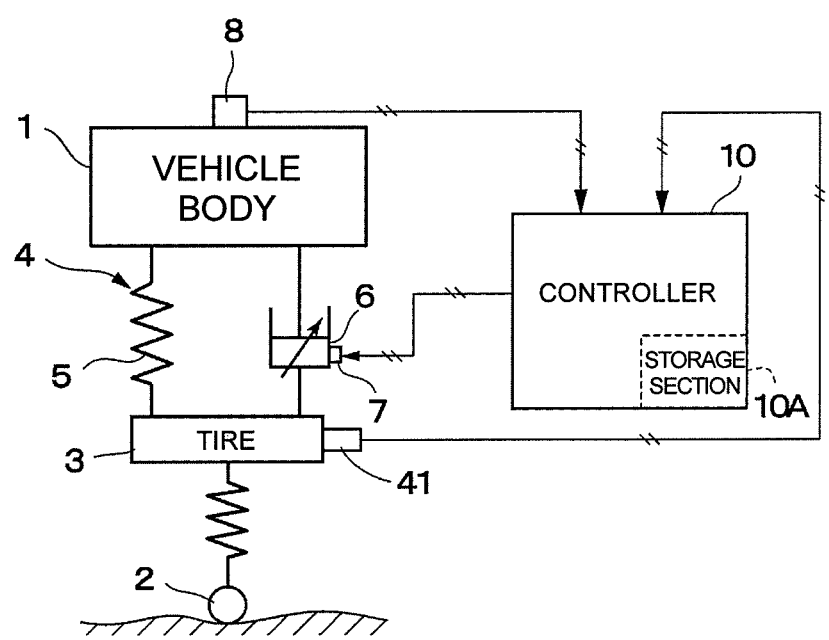
FIG. 9 is a configuration diagram illustrating the suspension control apparatus for a vehicle comprising a control apparatus for a damping-force adjustable shock absorber according to a second embodiment.
Figure 10:
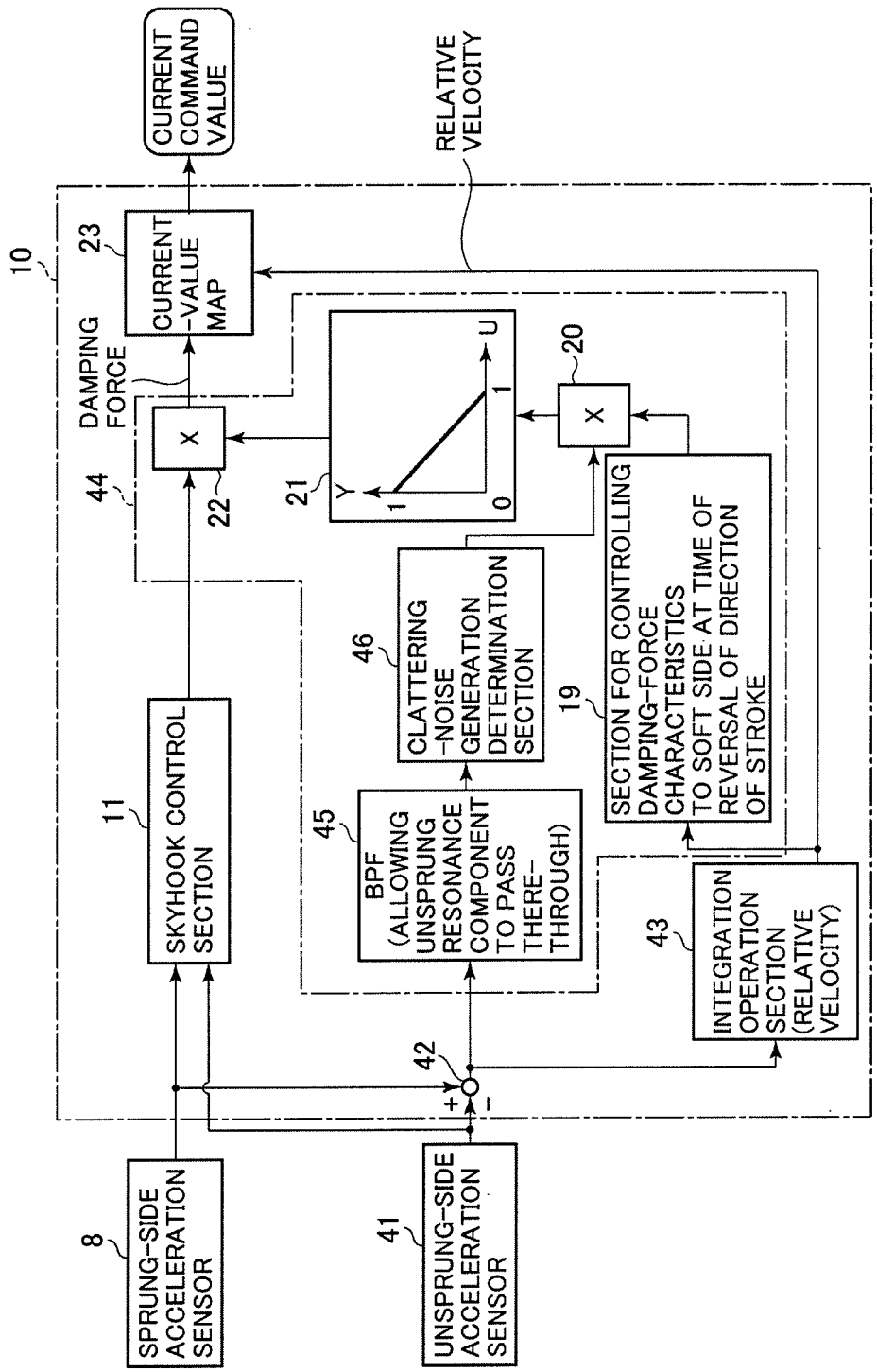
FIG. 10 is a control block diagram illustrating the contents of the control performed by the controller illustrated in FIG. 1.

Next, FIGS. 9 and 10 illustrate a second embodiment of the present invention. In the second embodiment, the same components as those of the first embodiment are denoted by the same reference symbols, and therefore the description thereof is herein omitted.

The second embodiment is characterized in the following configuration. An acceleration sensor 41 on the so-called unsprung side is provided to the vehicle on the tire 3 side. The vertical vibration acceleration on the wheel 2 (tire 3) side is detected by the acceleration sensor 41. Then, the detected signal is output to the controller 10.

Subtraction processing is performed by a computing section 42 illustrated in FIG. 10. Specifically, an acceleration signal on the unsprung (wheel 2) side, which is detected by the acceleration sensor 41, and the acceleration signal on the sprung (vehicle body 1) side, which is detected by the acceleration sensor 8, are subjected to subtraction processing to calculate a relative acceleration between the sprung side and the unsprung side. In a subsequent integration operation section 43, the relative acceleration between the sprung side and the unsprung side is integrated to obtain a vertical relative velocity between the vehicle body 1 and the wheel 2. The relative velocity is the same signal, for example, as that indicated by the characteristic line 29, which is illustrated in FIGS. 7 and 8 and described in the first embodiment. The same processing as that performed in the first embodiment is performed on the signal by the section 19 for controlling damping-force characteristics to soft side at time of reversal of direction of stroke.

On the other hand, a clattering-noise control section 44 included in the controller 10 is configured in substantially the same manner as that of the clattering-noise control section 13 described in the first embodiment. The clattering-noise control section 44 includes the section 19 for controlling damping-force characteristics to soft side at time of reversal of direction of stroke, the signal processing section 20, the signal converting section 21, the other signal processing section 22 different from the signal processing section 20, a filter section 45 (hereinafter, referred to as a BPF 45), and a clattering-noise generation determination section 46. The BPF 45 and the clattering-noise generation determination section 46 are described below.

In this case, the BPF 45 constitutes the vibration component extracting means in substantially the same manner as that of the BPF 14 described in the first embodiment. However, the BPF 45 used in the second embodiment performs the bandpass filter processing on the signal of the relative acceleration between the sprung side and the unsprung side, which is calculated by the computing section 42, to extract the vibration component at a predetermined specific frequency (specifically, unsprung natural frequency in the vicinity of, for example, 13 Hz, which corresponds to the resonance frequency on the wheel 2 side).

The clattering-noise generation determination section 46 is configured in substantially the same manner as that of the clattering-noise generation determination section 15 described in the first embodiment. The clattering-noise generation determination section 46 determines based on the signal of the vibration component, which is extracted by the BPF 45, whether or not the abnormal noise called "clattering noise" is generated from the shock absorber 6.

As described above, in the second embodiment configured as described above, the sprung acceleration signal obtained by the acceleration sensor 8 and the unsprung acceleration signal obtained by the acceleration sensor 41 are subjected to the subtraction processing in the computing section 42 to obtain the relative acceleration between the sprung side and the unsprung side. Then, the clattering-noise control section 44 determines based on the relative acceleration between the sprung side and the unsprung side whether or not the clattering noise is generated. According to the result of determination, the skyhook control and the control for switching the damping-force characteristics to the soft side at the time of reversal of the direction of the stroke, which prevents the generation of the clattering noise, are performed.

As a result, in substantially the same manner as that of the first embodiment described above, the generation of the abnormal noise which is called "clattering noise" can be suppressed or reduced at the time when the direction of the stroke of the shock absorber 6 is reversed even in the second embodiment. Accordingly, the damping force generated by the shock absorber 6 is appropriately controlled to improve the vehicle ride comfort. Moreover, since the acceleration on the unsprung side, which is used for the determination of the generation of the clattering noise, is small on a low-frequency road surface such as the undulating road, the control effects for suppressing the generation of the clattering noise are not required. Therefore, desired control effects can be obtained without controlling the damping-force characteristics to be switched to the soft side.

Figure 11:
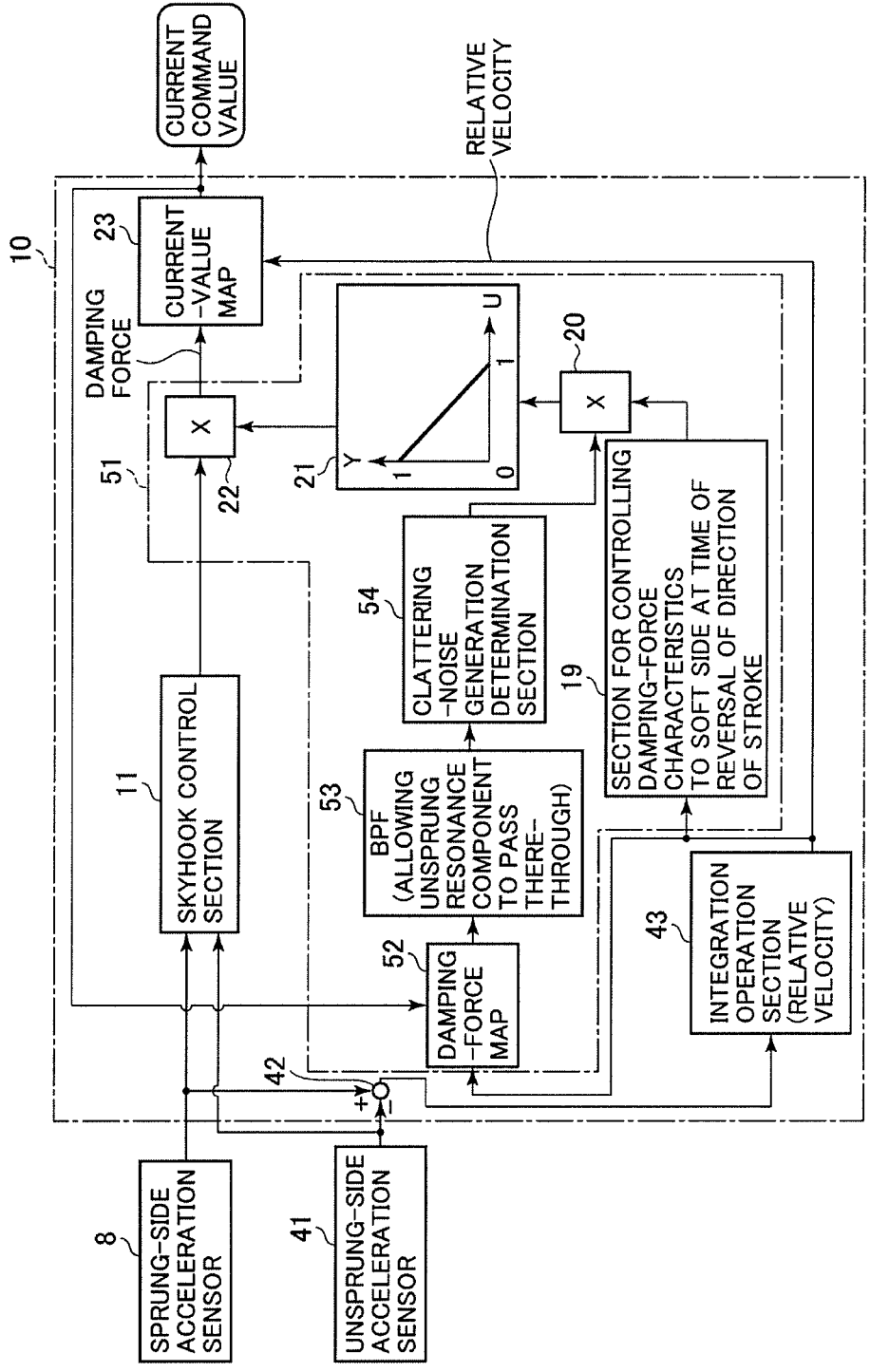
FIG. 11 is a control block diagram illustrating the contents of the control performed by the suspension control apparatus for a vehicle comprising a control apparatus for a damping-force adjustable shock absorber according to a third embodiment.
Figure 12:
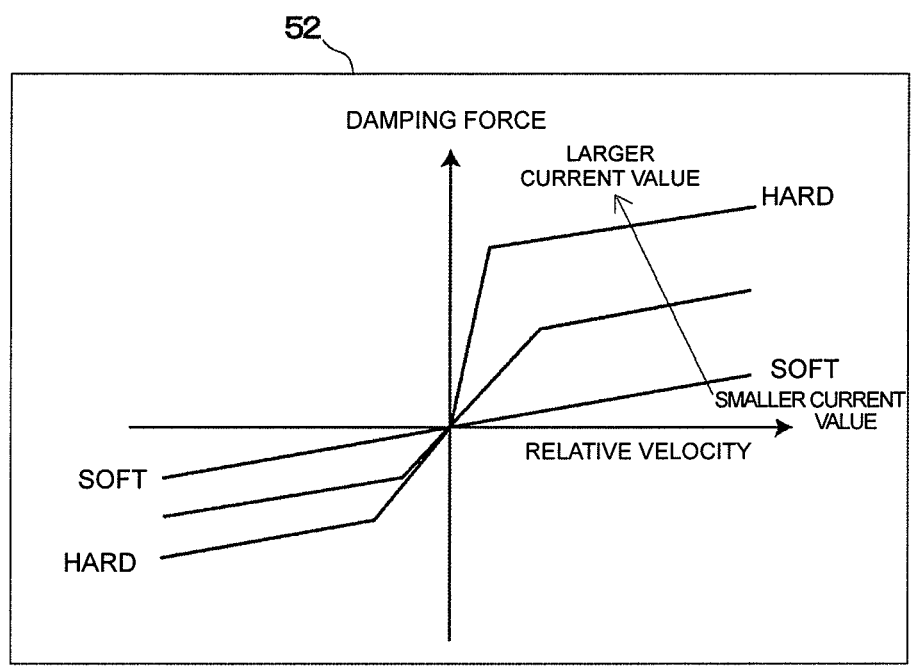
FIG. 12 is a characteristic line diagram illustrating a damping-force map illustrated in FIG. 11 in the relation with the relative velocity.

Next, FIGS. 11 and 12 illustrate a third embodiment of the present invention. In the third embodiment, the same components as those of the first embodiment described above are denoted by the same reference symbols, and the description thereof is herein omitted.

The third embodiment is characterized in the following configuration. The generation of the "clattering noise" is determined using a damping-force map 52 described below. In the third embodiment, the acceleration sensor 41 on the unsprung side is provided as in the second embodiment described above so that the vertical vibration acceleration on the wheel 2 (tire 3) side is detected by the acceleration sensor 41.

The unsprung acceleration signal detected by the acceleration sensor 41 is subtracted from the sprung acceleration signal detected by the acceleration sensor 8 by the computing section 42 illustrated in FIG. 11 so as to calculate the relative acceleration between the sprung side and the unsprung side. Subsequently, in the integration operation section 43, the relative acceleration between the sprung side and the unsprung side is integrated to obtain the vertical relative velocity between the vehicle body 1 and the wheel 2. The obtained relative velocity is a signal similar to that indicated by, for example, the characteristic line 29 illustrated in FIGS. 7 and 8, which is described in the first embodiment.

On the other hand, the clattering-noise control section 51 included in the controller 10 is configured in substantially the same manner as that of the clattering-noise control section 13 described in the first embodiment. The clattering-noise control section 51 includes the section 19 for controlling damping-force characteristics to soft side at time of reversal of direction of stroke, the signal processing section 20, the signal converting section 21, the other signal processing section 22, the damping-force map 52, a filter section 53 (hereinafter, referred to as "BPF" 53), and a clattering-noise generation determination section 54. The damping-force map 52, the BPF 53, and the clattering-noise generation determination section 54 are described below.

In this case, the damping-force map 52 is obtained by showing the relation among the current value (in the example illustrated in FIG. 12, the characteristic changes from soft to hard in accordance with an increase in current value), the relative velocity, and the damping force in the form of a map based on the experimental data obtained so far, as indicated by characteristic lines illustrated in FIG. 12. Then, when the relative velocity between the vehicle body 1 and the wheel 2 and the current command value are input from the integration operation section 43 and the current-value map 23, the damping-force map 52 calculates a signal of the damping force corresponding to the relative velocity and the current value at this time by map processing.

Further, the subsequent BPF 53 constitutes the vibration component extracting means in substantially the same manner as that of the BPF 14 described in the first embodiment. However, the BPF 53 used in the present embodiment performs the bandpass filter processing on the signal of the damping force, which is calculated based on the damping-force map 52, to extract the vibration component at a predetermined specific frequency (specifically, unsprung natural frequency in the vicinity of, for example, 13 Hz, which corresponds to the resonance frequency on the wheel 2 side).

The clattering-noise generation determination section 54 is configured in substantially the same manner as that of the clattering-noise generation determination section 15 described in the first embodiment. The clattering-noise generation determination section 54 determines based on the signal of the vibration component, which is extracted by the BPF 53, whether or not the abnormal noise called "clattering noise" is generated from the shock absorber 6.

In the third embodiment configured as described above, the sprung acceleration signal detected by the acceleration sensor 8 and the unsprung acceleration signal detected by the acceleration sensor 41 are subjected to the subtraction processing in the computation section 42 to obtain the relative acceleration between the sprung side and the unsprung side. Then, the clattering-noise control section 51 performs the bandpass filter processing on the signal of the damping force, which is calculated based on the damping-force map 52, according to the relative velocity between the vehicle body 1 and the wheel 2, which is obtained from the relative acceleration, to thereby determine whether or not the clattering noise is generated. According to the result of determination, the clattering-noise control section 51 performs the skyhook control and the control for switching the damping-force characteristics to the soft side at the time of reversal of the direction of the stroke, which is for preventing the generation of the clattering noise.

As a result, in substantially the same manner as that of the first and the second embodiments described above, the generation of the abnormal noise which is called "clattering noise" can be suppressed or reduced at the time when the direction of the stroke of the shock absorber 6 is reversed even in the third embodiment. Accordingly, the damping force generated by the shock absorber 6 is appropriately controlled to improve the vehicle ride comfort.

In particular, in the third embodiment, the damping-force map 52 is included in the clattering-noise control section 51. Therefore, whether or not the clattering noise is generated can be stably determined by using the unsprung acceleration, the relative acceleration, and the damping-force estimated value (calculated based on the damping-force map 52), which is correlated with the amount of tension of the upper mount, and the like.

Note that, in the third embodiment, only when, for example, the direction of the stroke of the shock absorber 6 is reversed from the extension stroke to the contraction stroke, the damping-force characteristics can be switched to the soft side using the damping-force estimated value obtained according to the damping-force map 52.

Figure 13:
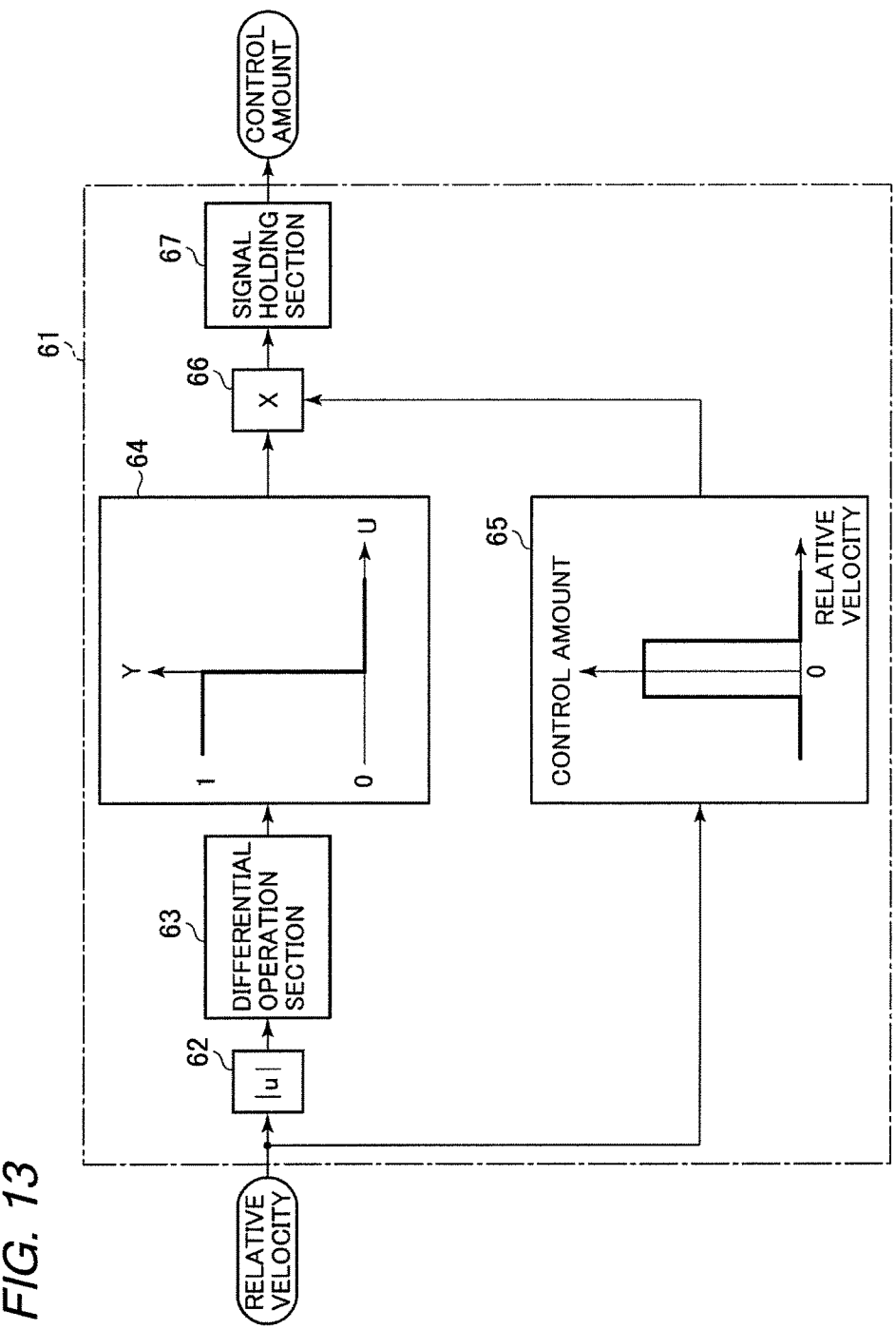
FIG. 13 is a control block diagram illustrating a configuration of a clattering-noise control section according to a fourth embodiment.
Figure 14:
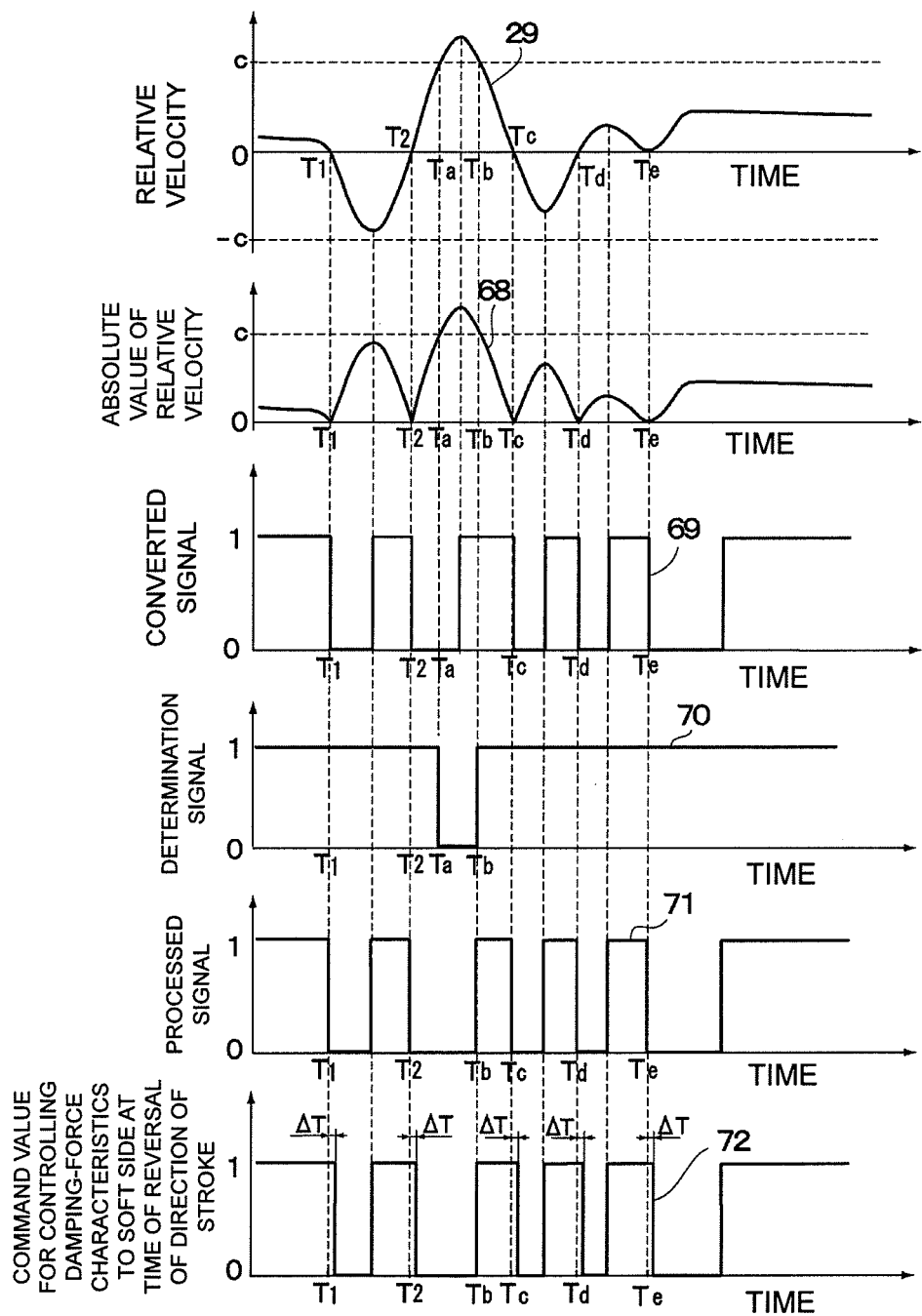
FIG. 14 is a characteristic line diagram illustrating the relation among the relative velocity, an absolute value of the relative velocity, the converted signal, a determination signal, the processed signal, and the command value for controlling damping-force characteristics to soft side at time of reversal of direction of stroke.

Next, FIGS. 13 and 14 illustrate a fourth embodiment of the present invention. In the fourth embodiment, the same components as those of the first embodiment described above are denoted by the same reference symbols, and the description thereof is herein omitted.

The fourth embodiment is characterized in the following configuration. In comparison with, for example, the configuration of the section 19 for controlling damping-force characteristics to soft side at time of reversal of direction of stroke described in the first embodiment, a configuration of a section 61 for controlling damping-force characteristics to soft side at time of reversal of direction of stroke is changed so that the damping-force characteristics are controlled to the soft side when the relative velocity between the vehicle body 1 and the wheel 2 becomes closer to zero.

As illustrated in FIG. 13, the section 61 for controlling damping-force characteristics to soft side at time of reversal of direction of stroke includes a first computing section 62, a second computing section 63, a signal converting section 64, a determination processing section 65, a signal processing section 66, and a signal holding section 67. The first computing section 62 computes an absolute value |u| of the relative velocity. The second computing section 63 differentiates the absolute value |u| (indicated by a characteristic line 68). The signal converting section 64 converts a differential signal output from the second computing section 63 into "1" when the differential signal has a "negative" value, and converts the differential signal into "0" when the differential signal has a "positive" value (indicated by a characteristic line 69). The determination processing section 65, the signal processing section 66, and the signal holding section 67 are described below.

Then, the determination processing section 65 outputs a determination signal as a value "1" as indicated by a characteristic line 70 in FIG. 14 when the relative velocity between the vehicle body 1 and the wheel 2, as indicated by the characteristic line 29 illustrated in FIG. 14, is present between a third threshold value c and a fourth threshold value −c (for example, c=0.15 m/s) (−c≤relative velocity≤c). On the other hand, when the relative velocity is larger than the third threshold value c or smaller than the fourth threshold value −c (out of the range of ±c; relative velocity<−c or c<relative velocity), the determination signal is output as a value "0".

The signal processing section 66 illustrated in FIG. 13 multiplies a converted signal (indicated by the characteristic line 69 illustrated in FIG. 14) output from the signal converting section 64 and a determination signal output from the determination processing section 65 (indicated by a characteristic line 70 illustrated in FIG. 14) to output a processed signal indicated by a characteristic line 71 illustrated in FIG. 14. Specifically, when the absolute value |u| of the relative velocity decreases (the differential value is negative) and, at the same time, the absolute value |u| of the relative velocity is not larger than a determined threshold value (−c≤relative velocity≤c), the signal processing section 66 outputs the processed signal "1" (indicated by the characteristic line 71) which allows the determination that the relative velocity becomes closer to zero. As a result, the processed signal output from the signal processing section 66 has the same value as that of the converted signal indicated by the characteristic line 69 at time T1 or T2 illustrated in FIG. 14, for example, and has "0" between, for example, time T2 and time Tb as a result of the multiplication between the converted signal and the determination signal. After the time Tb, the processed signal has the same value as that of the converted signal indicated by the characteristic line 69.

Then, the signal holding section 67 illustrated in FIG. 13 performs processing for holding the processed signal "1" obtained by the signal processing section 66 for a period of time increased by a predetermined period of time ΔT and outputs a soft control command value at the time of the reversal of the direction of the stroke as indicated by a characteristic line 72 illustrated in FIG. 14. As a result, as the control amount output from the signal holding section 67 of the section 61 for controlling damping-force characteristics to soft side at time of reversal of direction of stroke, the value "1" is held until ΔT elapse from the time T1. Thereafter, the value of the control amount becomes "0" and then, becomes "1" again. Then, until ΔT elapse from the time T2, the value "1" is held. Thereafter, the value of the control amount becomes "0" again until the time Tb. After the time Tb, the value of the control amount becomes "1" again. Until ΔT elapse from time Tc, the value "1" is held. Thereafter, the value becomes "0" again. Similarly, even at the time Td and the time Te, the value "1" is held for ΔT longer. Then, the value becomes "0".

As described above, the section 61 for controlling damping-force characteristics to soft side at time of reversal of direction of stroke used in the fourth embodiment holds the soft control command value (control amount) output from the signal holding section 67 to the value "1" for ΔT longer in consideration of a time delay from the output of the control amount (control signal) to the actuator 7 of the shock absorber 6 to the actual achievement of the soft damping-force characteristics. As a result, the control for switching the damping-force characteristics to the soft side at the time of reversal of the direction of the stroke can be performed so that the damping force surely has the soft damping-force characteristics around the timing at which the relative velocity becomes zero. As a result, the generation of the clattering noise can be efficiently prevented.

Specifically, a delay is generated from the output of the control signal from the controller 10 to the actuator 7 of the shock absorber 6 to the actual achievement of the soft characteristics of the generated damping force. Therefore, the control is performed so that the soft command is generated when the relative velocity becomes closer to zero even if the relative velocity is large. As a result, the damping force surely has the soft characteristics around the timing at which the relative velocity becomes equal to zero. Accordingly, the generation of the clattering noise is effectively prevented.

As a result, in substantially the same manner as that of the first embodiment described above, the generation of the abnormal noise which is called "clattering noise" can be suppressed or reduced at the time when the direction of the stroke of the shock absorber 6 is reversed even in the fourth embodiment configured as described above. Accordingly, the damping force generated by the shock absorber 6 is appropriately controlled to improve the vehicle ride comfort.

In particular, in the fourth embodiment, after the conditions under which the "clattering noise" is generated are estimated, the generated damping force can be controlled in view of responsivity (delay in response time) of the shock absorber 6 so that the damping force becomes small at the time of the reversal of the direction of the stroke. For the determination of the direction of the stroke, the relative velocity with a phase lead in consideration of switching responsivity of the damping force, and the relative acceleration and the unsprung acceleration, which have a phase lead relative to the relative velocity, can also be used. In this manner, the command can be output so that the damping force has the soft characteristics at the time of the reversal of the direction of the stroke.

Figure 15:
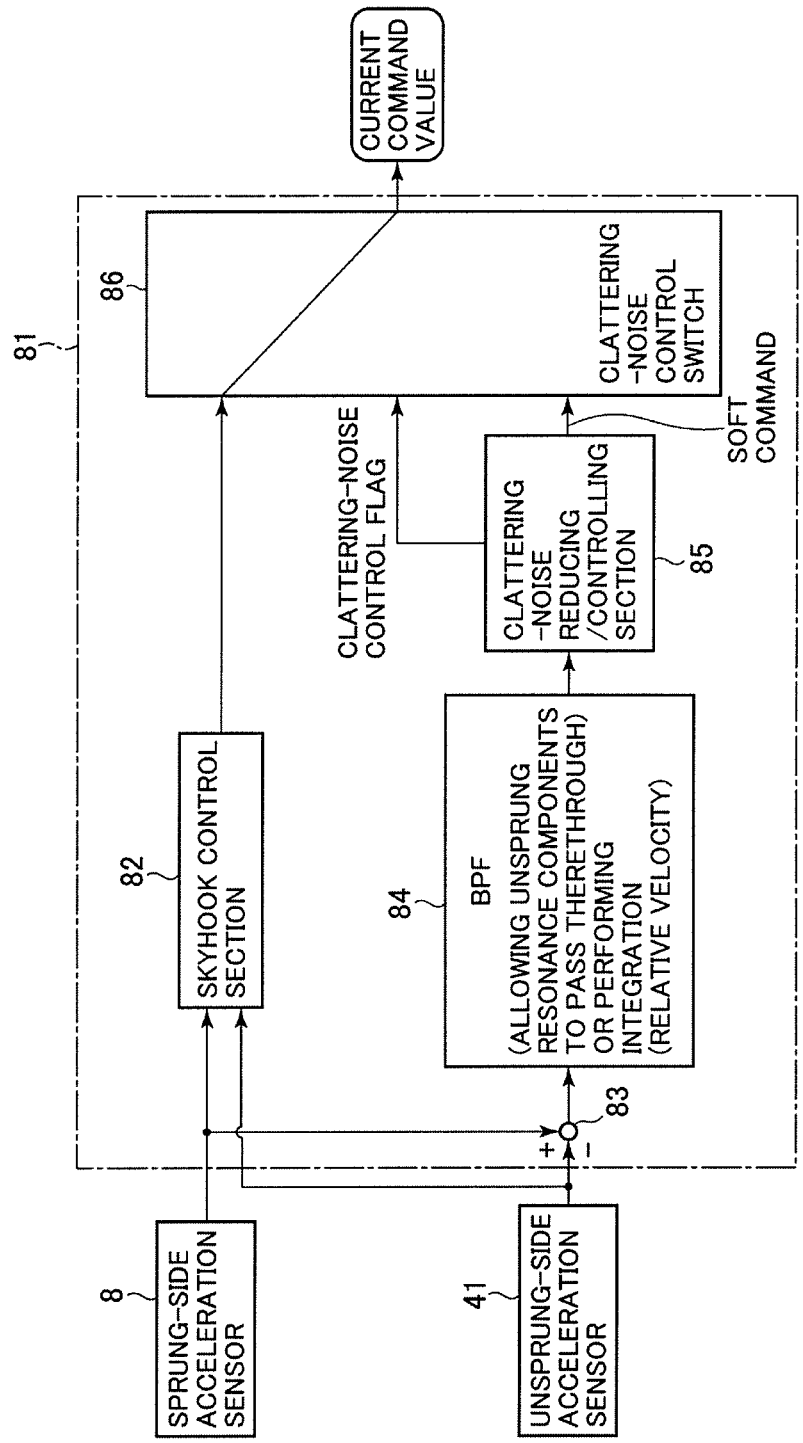
FIG. 15 is a configuration diagram illustrating the suspension control apparatus for a vehicle comprising a control apparatus for a damping-force adjustable shock absorber according to a fifth embodiment.

Next, FIG. 15 illustrates a fifth embodiment of the present invention. In the fifth embodiment, the same components as those of the first embodiment described above are denoted by the same reference symbols, and the description thereof is herein omitted.

The fifth embodiment is characterized in the following configuration. A clattering-noise control switch 86 is included in a controller 81. When it is determined that the "clattering noise" is generated, the clattering-noise control switch 86 is switched so that the soft command is output to reduce the damping force instead of performing the general skyhook control.

The controller 81 is configured in the same manner as that described in the second embodiment illustrated in FIG. 9. An input side of the controller 81 is connected to the acceleration sensor 8 on the sprung side and the acceleration sensor 41 on the unsprung side. An output side of the controller 81 is connected to the actuator 7 of the shock absorber 6 so as to output the current command value output from the clattering-noise control switch 86 described below to the actuator 7.

The controller 81 used in this embodiment includes a skyhook control section 82, a computing section 83, a vibration extracting section 84 corresponding to the vibration component extracting means, a clattering-noise reducing/controlling section 85, and the clattering-noise control switch 86. In this case, the skyhook control section 82 is configured in substantially the same manner as that of the skyhook control section 11 described in the first embodiment. The computing section 83 performs the subtraction processing on the sprung acceleration signal, which is obtained by the acceleration sensor 8, and the unsprung acceleration signal, which is obtained by the acceleration sensor 41, to calculate the relative acceleration between the sprung side and the unsprung side.

As in the case of the BPF 45 which is described in the second embodiment and illustrated in FIG. 10, the vibration extracting section 84 performs the bandpass filter processing on the signal of the relative acceleration between the sprung side and the unsprung side, which is calculated by the computing section 83, to extract a vibration component at a predetermined specific frequency (unsprung natural frequency in the vicinity of, for example, 13 Hz, which corresponds to a resonance frequency on the wheel 2 side). In this case, the vibration extracting section 84 may integrate the signal of the relative acceleration between the sprung side and the unsprung side, which is calculated by the computing section 83, as illustrated in FIG. 15, to obtain the relative velocity between the sprung side and the unsprung side. Even in this manner, the vibration component at the predetermined specific frequency can be extracted.

The clattering-noise reducing/controlling section 85 is configured in substantially the same manner as that of the clattering-noise generation determination section 46 described in the second embodiment. The clattering-noise reducing/controlling section 85 determines based on the signal of the vibration component, which is extracted from the vibration extracting section 84, whether or not the abnormal noise called the "clattering noise" is generated from the shock absorber 6. The clattering-noise reducing/controlling section 85 outputs a clattering-noise control flag to the clattering-noise control switch 86 and, at the same time, outputs the soft command for switching the damping-force to the soft side when it is determined that the clattering noise is generated at the time of, for example, reversal of the direction of the stroke (for example, when the relative velocity is small).

Next, the clattering-noise control switch 86 performs a switching control according to the soft command output from the clattering-noise reducing/controlling section 85. When it is determined that the "clattering noise" is generated from the shock absorber 6, the clattering-noise control switch 86 outputs the current command value so that the damping force is controlled to be switched to the soft side. At the time of normal control performed other than in the above-mentioned case, the clattering-noise control switch 86 outputs the current command value corresponding to the original target damping force so that the damping-force characteristics obtained by the computation processing performed in the skyhook control section 82 can be demonstrated.

Specifically, the clattering-noise reducing/controlling section 85 determines that the "clattering noise" is generated when the vibration component at the specific frequency (for example, amplitude of the vibration) is larger than a predetermined criterion value. Then, the clattering-noise control switch 86 switches the generated damping force to the soft side over a predetermined period of time (for example, over one stroke until the direction of the stroke is reversed between the extension stroke and the contraction stroke) in response to the soft command output from the clattering-noise reducing/controlling section 85.

As described above, in the fifth embodiment configured as described above, the sprung acceleration signal which is output from the acceleration sensor 8 and the unsprung acceleration signal which is output from the acceleration sensor 41 are subjected to the subtraction processing in the computing section 83 to obtain the relative acceleration between the sprung side and the unsprung side. As a result, in substantially the same manner as in the second embodiment described above, the generation of the "clattering noise" in the shock absorber 6 at the time of the reversal of the direction of the stroke can be suppressed and reduced. Accordingly, the damping force generated by the shock absorber 6 can be appropriately controlled to improve the vehicle ride comfort.

In this embodiment, in particular, the clattering-noise control switch 86 is switched in response to the soft command output from the clattering-noise reducing/controlling section 85. Thus, in comparison with the first to fourth embodiments, for example, the configuration can be simplified. When the condition corresponding to the generation of the "clattering noise" and the condition corresponding to the small relative velocity are both satisfied, the generated damping force can be reduced to have the softer characteristics.

Note that, in the first embodiment, the gain map 18 is configured so that the gain Kc is set to zero "0" when the control amount is less than the criterion value a (or equal to or less than the criterion value a) and the gain Kc is set to "1" when the control amount is equal to or larger than the criterion value a (or exceeds the criterion value a). However, the configuration of the gain map 18 is not limited thereto. The gain map may be configured so that the gain smoothly increases from "0" to "1" according to an increase in the control amount. With the configuration as described above, the amount of skyhook control reduces (the damping-force characteristics become softer) as the vibration component at the specific frequency becomes larger. Thus, a change in the damping-force characteristics becomes smooth. Similarly, the characteristic line 30 of the section 19 for controlling damping-force characteristics to soft side at time of reversal of direction of stroke can be configured smoothly (for example, like Gaussian curve), or a lowpass filter or the like is used to smooth the change in damping-force characteristics.

As indicated by the characteristic line 29 illustrated in FIG. 7, for example, the case where it is determined that the direction of the stroke is reversed when the relative velocity falls within the range between the first threshold value b and the second threshold value −b has been described. However, the present invention is not limited thereto. Specifically, the "clattering noise" is frequently generated when the vehicle runs on a road in bad conditions under which the unsprung vibration is likely to be excited. Therefore, when the road on which the vehicle is running is determined as the road in bad conditions using road-surface determination means (for example, which is configured to determine that the road is in bad conditions when the unsprung vibration becomes larger than a threshold value), the above-mentioned threshold value b is set smaller, for example. In this manner, the "clattering noise" can be suppressed preferentially.

When a vehicle speed while the vehicle is running is high, wind noise or the like becomes louder, and hence the "clattering noise" is hardly heard by a driver or the like. Therefore, in a case where vehicle-speed determination means (for example, which is configured to determine that the vehicle speed is high when the vehicle speed becomes larger than a threshold value) is used to determine that the vehicle speed is high, the above-mentioned threshold value b is set larger when the vehicle speed is high. As a result, the control performed by the skyhook control section 11 or the like can be performed preferentially.

In emergency such as a case where, for example, a steering operation or a driving operation for avoiding an obstacle is performed, it is important to enhance damper characteristics and kinematic performance of the shock absorber 6. Therefore, when the occurrence of an emergency is determined using emergency determination means (for example, which is configured to determine that an emergency occurs when a steering angular speed becomes larger than a threshold value), the control for suppressing the "clattering noise" may be temporarily interrupted.

For the determination of the reversal of the direction of the stroke, the relative velocity with a phase lead, the relative acceleration having a phase lead relative to the relative velocity or the unsprung acceleration having a phase lead relative to the relative velocity may be used so that the soft command is output to switch the damping-force characteristics of the shock absorber 6 to the soft side at the time of the reversal of the direction of the stroke, in consideration of switching responsivity or the like of the shock absorber 6.

In the embodiments described above, the example where the control signal serving as the soft control command value for switching the damping-force characteristics to the soft side is output from the controller at the time of reversal of the direction of the stroke has been described. Alternatively, the control signal may be output so that the damping force has medium characteristics between hard and soft. Specifically, when the damping-force characteristics are closer to soft than hard, the generation of the "clattering noise" can be suppressed.

In the first embodiment, the skyhook control section 11 is included in the controller 10. However, the present invention is not limited thereto. Target damping-force setting means using other than the skyhook control may be used. For some changes in the configuration as described above, the same changes can be made even in the second to fifth embodiments.

The invention encompassed in the embodiments described above is now described. Specifically, the present invention includes the vibration component extracting means for extracting the vibration component at a predetermined specific frequency from extension/contraction movement of the shock absorber, in which the controller includes a control apparatus for switching the damping-force characteristics so that the damping-force characteristics become softer as the vibration component at the specific frequency (for example, the amplitude of the vibration, energy of the vibration, and the like) becomes larger. As described above, as the vibration component at the specific frequency becomes larger, the damping force of the shock absorber is switched to be softer. As a result, the generation of the "clattering noise" corresponding to abnormal noise, which is generated while the vehicle is running, can be further suppressed.

The present invention includes the vibration component extracting means for extracting the vibration component at a predetermined specific frequency from extension/contraction movement of the shock absorber, in which the controller includes a control apparatus for switching the damping-force characteristics are switched to the soft side when the vibration component at the specific frequency exceeds a predetermined criterion value and, in addition, when the direction of the stroke of the shock absorber is reversed.

In the present invention, the controller includes a control apparatus for determining based on a relative velocity between the vehicle body and the wheel that the direction of the stroke of the shock absorber is reversed.

Further, the present invention includes the vibration component extracting means for extracting the vibration component at the predetermined specific frequency from the extension/contraction movement of the shock absorber, in which the controller includes the control apparatus for switching the damping-force characteristics to the soft side over a predetermined period of time when the vibration component at the specific frequency is larger than a predetermined criterion value.

According to the embodiments described above, when the direction of the stroke of the shock absorber is reversed between the extension stroke and the contraction stroke, the damping-force characteristics are controlled to be switched to the soft side. In this manner, the generation of the "clattering noise" can be suppressed. In addition, vehicle ride comfort can be improved.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Application No. 2009-272121 filed on Nov. 30, 2009. The entire disclosure of Japanese Patent Application No. 2009-272121 filed on Nov. 30, 2009 including specification, claims, drawings and summary is incorporated herein by reference in its entirety.

What is claimed is:

1. A suspension control apparatus for a vehicle comprising:
 a damping-force adjustable shock absorber interposed between a vehicle body and a wheel of a vehicle, and
 a controller for variably controlling damping-force characteristics of the damping-force adjustable shock absorber between hard and soft,
 the controller comprising a vibration component extracting section configured to extract a vibration component at a predetermined specific frequency from extension/contraction movement of the damping-force adjustable shock absorber,
 wherein the controller is configured to determine based on a relative velocity between the vehicle body and the wheel that a direction of a stroke of the damping-force adjustable shock absorber is reversed between an extension stroke and a contraction stroke, and when the vibration component at the predetermined specific frequency exceeds a predetermined criterion value and near the direction of the stroke of the damping-force adjustable shock absorber being reversed, the controller switches the damping-force characteristics to a soft side before the direction of the stroke of the damping-force adjustable shock absorber is reversed, and maintains the damping-force characteristics of the soft side until after the direction of the stroke is reversed.

2. A suspension control apparatus for a vehicle according to claim 1,
wherein the controller is configured to switch the damping-force characteristics so that the damping-force characteristics become softer as the vibration component at the predetermined specific frequency becomes larger before the direction of the stroke of the damping-force adjustable shock absorber is reversed.

3. A suspension control apparatus for a vehicle according to claim 1, wherein the controller further comprises an emergency determination section, and
the controller is configured to temporarily interrupt the control for switching the damping-force characteristics to the soft side before the direction of the stroke of the damping-force adjustable shock absorber is reversed between the extension stroke and the contraction stroke, in case that it is determined by the emergency determination section that an emergency occurs.

4. A suspension control apparatus for a vehicle according to claim 1, wherein the controller performs control in consideration of a time delay from output of a control amount to an actuator of the damping-force adjustable shock absorber to switching of the damping-force characteristics to the soft side.

5. A suspension control apparatus for a vehicle according to claim 1, wherein the controller further comprises a damping-force map, and
the controller is configured to switch the damping-force characteristics to the soft side by using a damping-force estimated value obtained according to the damping-force map, only before the direction of the stroke of the damping-force adjustable shock absorber is reversed from the extension stroke to the contraction stroke.

6. A suspension control apparatus for a vehicle comprising:
a damping-force adjustable shock absorber interposed between a vehicle body and a wheel of a vehicle, and
a controller for variably controlling damping-force characteristics of the damping-force adjustable shock absorber between hard and soft,
the controller being configured to switch the damping-force characteristics to a soft side when a direction of a stroke of the damping-force adjustable shock absorber is reversed between an extension stroke and a contraction stroke, and
the suspension control apparatus further comprising a vibration component extracting section configured to extract a vibration component at a predetermined specific frequency from extension/contraction movement of the damping-force adjustable shock absorber,
wherein the controller is configured to switch the damping-force characteristics so that the damping-force characteristics become softer as the vibration component at the predetermined specific frequency becomes larger, when the vibration component at the predetermined specific frequency exceeds a predetermined criterion value and when the direction of the stroke of the damping-force adjustable shock absorber is reversed,
wherein the controller further comprises a road-surface determination section, and
wherein the controller is configured to set a smaller value as the predetermined criterion value, the smaller value being smaller than that in a normal road condition, when it is determined by the road-surface determination section that a road condition is worse in comparison with a normal road condition.

7. A suspension control apparatus for a vehicle, comprising:
a damping-force adjustable shock absorber interposed between a vehicle body and a wheel of a vehicle, and
a controller for variably controlling damping-force characteristics of the damping-force adjustable shock absorber between hard and soft,
wherein the controller comprises a damping-force map and a vibration component extracting section configured to extract a vibration component at a predetermined specific frequency from extension/contraction movement of the damping-force adjustable shock absorber by using a damping-force estimated value obtained according to the damping-force map,
wherein the controller is configured to determine based on a relative velocity between the vehicle body and the wheel that the direction of the stroke of the damping-force adjustable shock absorber is reversed between an extension stroke and a contraction stroke, and
when the vibration component at the predetermined specific frequency exceeds a predetermined criterion value and near the direction of the stroke of the damping-force adjustable shock absorber being reversed, the controller switches the damping-force characteristics to a soft side before the direction of the stroke of the damping-force adjustable shock absorber is reversed, and maintains the damping-force characteristics of the soft side until after the direction of the stroke is reversed.

8. A suspension control apparatus for a vehicle according to claim 7,
wherein the controller is configured to switch the damping-force characteristics so that the damping-force characteristics become softer as the vibration component at the predetermined specific frequency becomes larger before the direction of the stroke of the damping-force adjustable shock absorber is reversed.

9. A suspension control apparatus for a vehicle according to claim 7, wherein the controller further comprises an emergency determination section, and
the controller is configured to temporarily interrupt the control for switching the damping-force characteristics to the soft side before the direction of the stroke of the damping-force adjustable shock absorber is reversed between the extension stroke and the contraction stroke, in case that it is determined by the emergency determination section that an emergency occurs.

10. A suspension control apparatus for a vehicle comprising:
a damping-force adjustable shock absorber interposed between a vehicle body and a wheel of a vehicle, and
a controller for variably controlling damping-force characteristics of the damping-force adjustable shock absorber between hard and soft,
wherein the controller comprises a damping-force map, and a vibration component extracting section configured to extract a vibration component at a predetermined specific frequency from extension/contraction movement of the damping-force adjustable shock absorber by using a damping-force estimated value obtained according to the damping-force map, when the vibration component at the predetermined specific frequency exceeds a predetermined criterion value, the controller is configured to switch the damping-force characteristics to a soft side before a direction of a stroke of the damping-force adjustable shock absorber is reversed from an extension stroke to a contraction stroke, wherein the controller further comprises a road-surface determination section, and wherein the controller is configured to set a smaller value as the predetermined criterion value, the smaller value being smaller than that in a normal road condition, when it is determined by the road-surface determination section that a road condition is worse in comparison with a normal road condition.

11. A control apparatus for a damping-force adjustable shock absorber, for variably controlling damping-force characteristics of a damping-force adjustable shock absorber interposed between a vehicle body and a wheel of a vehicle between hard and soft, the control apparatus comprising:

a vibration component extracting section configured to extract a vibration component at a predetermined specific frequency from extension/contraction movement of the damping-force adjustable shock absorber, wherein the controller is configured to determine based on a relative velocity between the vehicle body and the wheel that a direction of a stroke of the damping-force adjustable shock absorber is reversed between an extension stroke and a contraction stroke, and when the vibration component at the predetermined specific frequency exceeds a predetermined criterion value and near the direction of the stroke of the damping-force adjustable shock absorber being reversed, the damping-force characteristics are switched to a soft side before the direction of the stroke of the damping-force adjustable shock absorber is reversed, and the damping-force characteristics of the soft side are maintained until after the direction of the stroke is reversed.

12. A controller for a damping-force adjustable shock absorber according to claim 11, wherein the damping-force characteristics are switched so that the damping-force characteristics become softer as the vibration component at the predetermined specific frequency becomes larger before the direction of the stroke of the damping-force adjustable shock absorber is reversed.

13. A suspension control apparatus for a vehicle comprising:

a damping-force adjustable shock absorber interposed between a vehicle body and a wheel of a vehicle, and a controller for variably controlling damping-force characteristics of the damping-force adjustable shock absorber between hard and soft, wherein the controller is configured to (i) determine that a direction of a stroke of the damping-force adjustable shock absorber is reversed between an extension stroke and a contraction stroke, when a relative velocity between the vehicle body and the wheel changes between positive and negative through zero, (ii) switch the damping-force characteristics to a soft side before the direction of the stroke is reversed and near the direction of the stroke of the damping-force adjustable shock absorber being reversed, and (iii) maintain the damping-force characteristics of the soft side until after the direction of the stroke is reversed, the switching of the damping-force characteristics to the soft side being controlled based on a threshold value of the relative velocity which is reached before and after the direction of the stroke is reversed, or based on a threshold value for an absolute value of the relative velocity, and a differential value of the relative velocity.

14. A suspension control apparatus for a vehicle comprising:

a damping-force adjustable shock absorber interposed between a vehicle body and a wheel of a vehicle, and a controller for variably controlling damping-force characteristics of the damping-force adjustable shock absorber between hard and soft, the controller being configured to switch the damping-force characteristics to a soft side when a direction of a stroke of the damping-force adjustable shock absorber is reversed between an extension stroke and a contraction stroke, and the suspension control apparatus further comprising a vibration component extracting section configured to extract a vibration component at a predetermined specific frequency from extension/contraction movement of the damping-force adjustable shock absorber, wherein the controller is configured to switch the damping-force characteristics to a soft side, when the vibration component at the predetermined specific frequency exceeds a predetermined criterion value and when the direction of the stroke of the damping-force adjustable shock absorber is reversed, wherein the controller further comprises a road-surface determination section, and wherein the controller is configured to set a smaller value as the predetermined criterion value, the smaller value being smaller than that in a normal road condition, when it is determined by the road-surface determination section that a road condition is worse in comparison with a normal road condition.

* * * * *